United States Patent
Zhao et al.

(10) Patent No.: US 11,082,275 B2
(45) Date of Patent: *Aug. 3, 2021

(54) ELECTRICAL APPARATUS AND WIRELESS COMMUNICATION METHOD FOR COMMUNICATION DEVICE WITH MULTIPLE ANTENNAS

(71) Applicant: Sony Corporation, Tokyo (JP)

(72) Inventors: Peiyao Zhao, Beijing (CN); Zhaocheng Wang, Beijing (CN); Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,060

(22) Filed: Feb. 5, 2020

(65) Prior Publication Data

US 2020/0177426 A1   Jun. 4, 2020

Related U.S. Application Data

(63) Continuation of application No. 16/082,537, filed as application No. PCT/CN2017/071071 on Jan. 13, 2017, now Pat. No. 10,616,023.

(30) Foreign Application Priority Data

Mar. 8, 2016 (CN) .......................... 201610130365.5

(51) Int. Cl.
*H04L 27/26* (2006.01)
*H04B 7/04* (2017.01)
(Continued)

(52) U.S. Cl.
CPC ........... *H04L 27/2613* (2013.01); *H04B 7/04* (2013.01); *H04B 7/0452* (2013.01);
(Continued)

(58) Field of Classification Search
CPC ............. H04L 27/2613; H04L 27/2636; H04L 25/0204; H04L 5/0048; H04L 25/02;
(Continued)

(56) References Cited

U.S. PATENT DOCUMENTS

| 8,837,525 B2 * | 9/2014 | Wang | ................ H04L 25/03955 370/480 |
| 10,763,926 B2 * | 9/2020 | Tan | ........................ H04B 7/063 |

(Continued)

FOREIGN PATENT DOCUMENTS

| CN | 1331528 A | 1/2002 |
| CN | 1710826 A | 12/2005 |

(Continued)

OTHER PUBLICATIONS

English-language translation of International Search Report and Written Opinion for International Application No. PCT/CN2017/071071 dated Mar. 29, 2017.

*Primary Examiner* — Jean B Corrielus
(74) *Attorney, Agent, or Firm* — Xsensus LLP

(57) ABSTRACT

An electronic device, and method, at a first communication apparatus having multiple antennas includes a memory for storing computer instructions; and a processing circuit configured to execute the stored computer instructions to: based on channel states of channels between the multiple antennas of the first communication apparatus and a second communication apparatus, determine channel characteristics of a first channel from the first communication apparatus to a second communication apparatus in an angle domain: based on the determined channel characteristics of the first channel in the angle domain, determine a first set of pilot signals used in the angle domain, the pilot signals in the first set of pilot signals being orthogonal to each other; and transform the first set of pilot signals into a second set of pilot signals for (Continued)

transmission over the multiple antennas of the first communication apparatus.

12 Claims, 19 Drawing Sheets

(51) Int. Cl.
*H04B 7/0452* (2017.01)
*H04L 5/00* (2006.01)
*H04L 25/02* (2006.01)

(52) U.S. Cl.
CPC ........ *H04L 5/0048* (2013.01); *H04L 25/0204* (2013.01); *H04L 27/2636* (2013.01); *H04L 25/02* (2013.01); *Y02D 30/70* (2020.08)

(58) Field of Classification Search
CPC ........ H04B 7/0452; H04B 7/04; Y02D 70/12; Y02D 70/10; Y02D 70/126
See application file for complete search history.

(56) References Cited

U.S. PATENT DOCUMENTS

| | | |
|---|---|---|
| 2002/0003774 A1 | 1/2002 | Wang et al. |
| 2006/0203932 A1 | 9/2006 | Palanki et al. |
| 2011/0110304 A1 | 5/2011 | Kuchi et al. |
| 2012/0082192 A1 | 4/2012 | Pelletier et al. |
| 2014/0056390 A1 | 2/2014 | Seyama |
| 2016/0380688 A1 | 12/2016 | Yan et al. |

FOREIGN PATENT DOCUMENTS

| | | |
|---|---|---|
| CN | 101166053 A | 4/2008 |
| CN | 104717686 A | 6/2015 |
| WO | 2015/154274 A1 | 10/2015 |

* cited by examiner

ELECTRICAL APPARATUS AND WIRELESS COMMUNICATION METHOD FOR COMMUNICATION DEVICE WITH MULTIPLE ANTENNAS

CROSS-REFERENCE TO RELATED APPLICATIONS

The present application is a continuation of U.S. application Ser. No. 16/082,537, filed Sep. 6, 2018, now U.S. Pat. No. 10,616,023, which is based on PCT filing PCT/CN2017/071071, filed Jan. 13, 2017, which claims priority to CN 201610130365.5, filed Mar. 8, 2016, the entire contents of each are incorporated herein by reference.

FIELD OF THE INVENTION

The present disclosure relates to an electronic device and a communication method, and more particularly, the present disclosure relates to an electronic device and a communication method in a Massive Multi-Input Multi-Output (MIMO) antenna system.

BACKGROUND

Recently, as massive MIMO antenna systems can significantly improve the spectrum efficiency and energy efficiency, massive MIMO antenna systems have been considered as a part of critical 5G technology in the future, and have attracted wide attention from academia and industry.

In the prior art, in order to make full use of diversity gain and multiplexing gain of a massive MIMO antenna system, a base station (BS) needs to be aware of the channel state of a channel between the base station and a user equipment (UE). In a Time Division Duplex (TDD) system, the channel state of a downlink channel between a BS and a UE can be obtained by using channel reciprocity. Therefore, a large number of documents in the current are focused on TDD massive MIMO antenna systems. However, TDD systems also face problems such as pollution of pilot signal (also referred to as training sequence, reference sequence, etc), and it is difficult for TDD systems to support high-speed mobile communication scenarios. On the other hand, most current cellular mobile communication systems operate in the Frequency Division Duplex (FDD) mode, and therefore the FDD mode is bound to be preserved in the evolution to the 5G standard.

DISCLOSURE OF THE INVENTION

The inventor of the present disclosure has found that, in a conventional massive MIMO antenna systems, since a traditional channel estimation method carries out channel estimation by sending orthogonal pilot signals (which may also be referred to as training sequences, reference sequences, etc) via different antennas, the number of physical resource units required to send the pilot signals increases with the number of antennas. Therefore, in the case where a UE or BS is provided with multiple antennas, as the number of antennas increases, the overhead of channel estimation increases, thereby greatly limiting the data throughput rate of the communication system. Currently, there is no feasible solution to solve this problem.

Therefore, the present application proposes a new technical solution addressed to at least one of the above problems.

One aspect of the present disclosure relates to an electronic device used for a first communication apparatus having multiple antennas, comprising: a memory for storing computer instructions; and a processing circuit configured to execute the stored computer instructions to: determine, based on channel states of channels between the multiple antennas of the first communication apparatus and the second communication apparatus, channel characteristics of a first channel from the first communication apparatus to a second communication apparatus in the angle domain; based on the determined channel characteristics of the first channel in the angle domain, determine a first set of pilot signals used in the angle domain, the pilot signals in the first set of pilot signals being orthogonal to each other; and transform the first set of pilot signals into a second set of pilot signals for transmission over the multiple antennas of the first communication apparatus.

One aspect of the present disclosure relates to an electronic device used for a second communication apparatus, comprising: a memory for storing computer instructions; and a processing circuit configured to execute the stored computer instructions to: perform channel estimation of a first channel from a first communication apparatus having multiple antennas to the second communication apparatus based on a second set of pilot signals from the first communication apparatus, wherein the second set of pilot signals is determined by the first communication apparatus by the following processes: determining, based on channel states of channels between the multiple antennas of the first communication apparatus and the second communication apparatus, channel characteristics of the first channel from the first communication apparatus to the second communication apparatus in the angle domain; based on the determined channel characteristics of the first channel in the angle domain, determining a first set of pilot signals used in the angle domain, the pilot signals in the first set of pilot signals being orthogonal to each other; and transforming the first set of pilot signals into the second set of pilot signals for transmission over the multiple antennas of the first communication apparatus.

One aspect of the present disclosure relates to a communication method for a first communication apparatus having multiple antennas, comprising: determining, based on channel states of channels between the multiple antennas of the first communication apparatus and the second communication apparatus, channel characteristics of a first channel from the first communication apparatus to a second communication apparatus in the angle domain; based on the determined channel characteristics of the first channel in the angle domain, determining a first set of pilot signals used in the angle domain, the pilot signals in the first set of pilot signals being orthogonal to each other; and transforming the first set of pilot signals into a second set of pilot signals for transmission over the multiple antennas of the first communication apparatus.

One aspect of the present disclosure relates to a communication method for a second communication apparatus, comprising: performing channel estimation of a first channel from a first communication apparatus having multiple antennas to the second communication apparatus based on a second set of pilot signals from the first communication apparatus, wherein the second set of pilot signals is determined by the first communication apparatus by the following processes: determining, based on channel states of channels between the multiple antennas of the first communication apparatus and the second communication apparatus, channel characteristics of the first channel from the first communication apparatus to the second communication apparatus in the angle domain; based on the determined channel characteristics of the first channel in the angle domain, determining a first set of pilot signals used in the angle domain, the pilot signals in the first set of pilot signals being orthogonal to each other; and transforming the first set of pilot signals into the second set of pilot signals for transmission over the multiple antennas of the first communication apparatus.

One aspect of the present disclosure relates to an electronic device used in a multi-antenna wireless communication system, the electronic device comprising: a memory for storing computer instructions; and a processing circuit configured to execute the stored computer instructions to: determine a channel angle between a communication terminal and a base station (BS) according to a channel state of an uplink channel from the communication terminal to the BS; from a plurality of pilot signals, select a part of the plurality of pilot signals for the channel angle, wherein the BS has multiple antennas, the plurality of pilot signals supporting channel angles covered by the multiple antennas of the BS; and transform the part of pilot signals into signals for transmission over the multiple antennas of the BS.

According to some embodiments of the present disclosure, the overhead of channel estimation may be reduced.

According to some embodiments of the present disclosure, it is also possible to further increase the data throughput rate of the communication system while maintaining lower overhead of channel estimation.

Other features and advantages of the present invention will become apparent from the following detailed description of exemplary embodiments of the present disclosure with reference to the accompanying drawings.

DESCRIPTION OF THE DRAWINGS

The accompanying drawings, which are incorporated in and constitute a part of this specification, illustrate embodiments of the present disclosure and, together with the description, serve to explain the principles of the present disclosure.

The present disclosure will be more clearly understood from the following detailed description with reference to the accompanying drawings, in which.

DETAILED DESCRIPTION OF PREFERRED EMBODIMENTS

Figure 1:
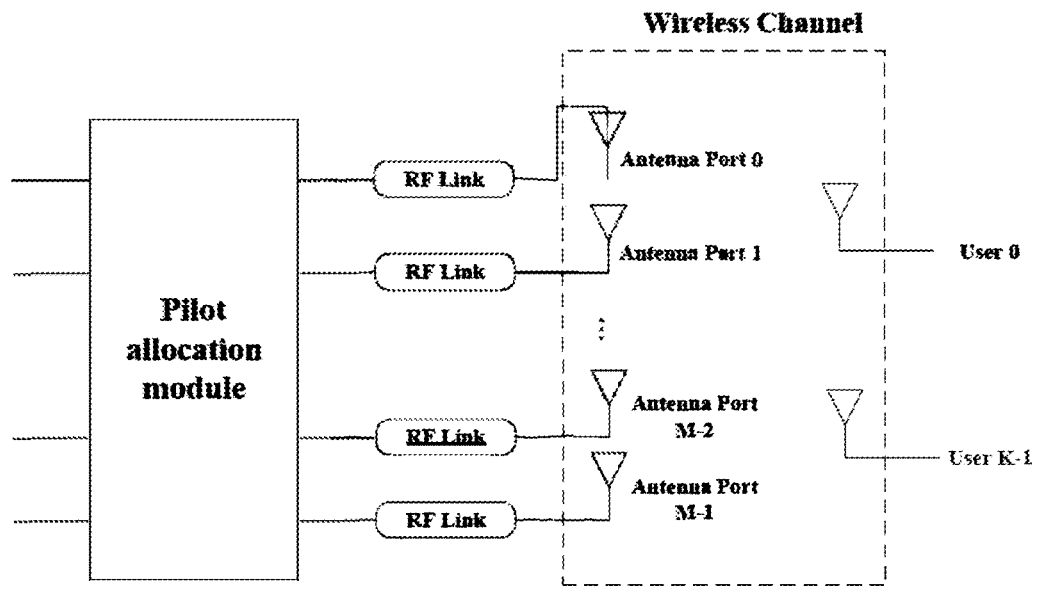
FIG. 1 is a diagram showing an example of the configuration of an orthogonal pilot system in the prior art.

Various exemplary embodiments of the present disclosure will now be described in detail with reference to the accompanying drawings. Notice that, unless otherwise specified, relative arrangement, numerical expressions and numerical values of components and steps set forth in these examples do not limit the scope of the invention.

Meanwhile, it should be understood that, for ease of description, dimensions of various parts shown in the drawings are not drawn in actual proportions.

The following description of at least one exemplary embodiment is in fact merely illustrative and is in no way intended as a limitation to the invention, its application or use.

Techniques, methods, and apparatus known to those of ordinary skill in the relevant art may not be discussed in detail, but where appropriate, these techniques, methods, and apparatuses should be considered as part of the specification.

In all the examples shown and discussed herein, any specific value should be construed as merely illustrative and not as a limitation. Thus, other examples of exemplary embodiments may have different values.

Note that, similar reference numerals and letters denote similar terms in the accompanying drawings, and therefore, once an item is defined in a drawing, there is no need for further discussion in the accompanying drawings.

1. EXAMPLE OF THE CONFIGURATION OF AN ORTHOGONAL PILOT SYSTEM IN THE PRIOR ART

FIG. 1 is a diagram showing an example of the configuration of an orthogonal pilot system in the prior art.

As shown in FIG. 1, in a wireless communication system of the prior art, a BS is equipped with M antennas (M is an integer and M≥1), each antenna is provided with a corresponding antenna port, and a corresponding RF link is arranged for each antenna port. In addition, the BS is also provided with a pilot allocation module, which allocates orthogonal pilot signals (also referred to as training sequences, reference sequences, etc) for respective antenna ports. Through corresponding antenna ports and antennas, the BS transmits the orthogonal pilot signals to one or more UEs over a wireless physical channel.

In the pilot allocation module of the prior art, orthogonal modes of pilot signals may include time domain orthogonal mode, frequency domain orthogonal mode, time-frequency two-dimensional orthogonal mode, code orthogonal mode, and other modes. For example, in an Orthogonal Frequency Division Multiplexing (OFDM) system of the prior art, the configurations of the above-mentioned orthogonal pilot signals may be illustrated as follows.

Figure 2:
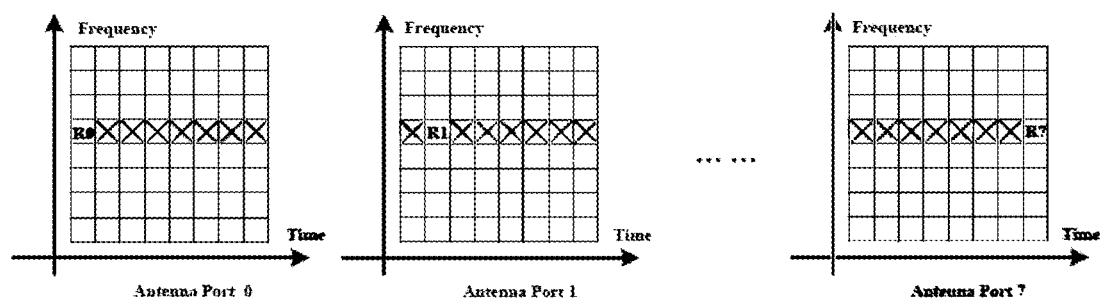
FIG. 2 is a diagram illustrating an example of allocating transmission resources for time-domain orthogonal pilot signals in the prior art.

FIG. 2 is a diagram illustrating an example of allocating transmission resources for time-domain orthogonal pilot signals in the prior art. As shown in FIG. 2, it is assumed that the BS is equipped with, for example, 8 antennas and 8 antenna ports correspondingly. The horizontal axis in FIG. 2 represents time, the vertical axis represents frequency, and each block represents a physical resource unit at a certain time and a certain frequency. As shown in FIG. 2, in the case of time-domain orthogonal pilot signals, different antenna ports transmit pilot signals at different times, but these different antenna ports use the same frequency to transmit these pilot signals. For example, antenna ports 0 to 7 may transmit pilot signals using physical resource units R0 to R7 at the same frequency F4, but different times T0 to T7, respectively.

Figure 3:
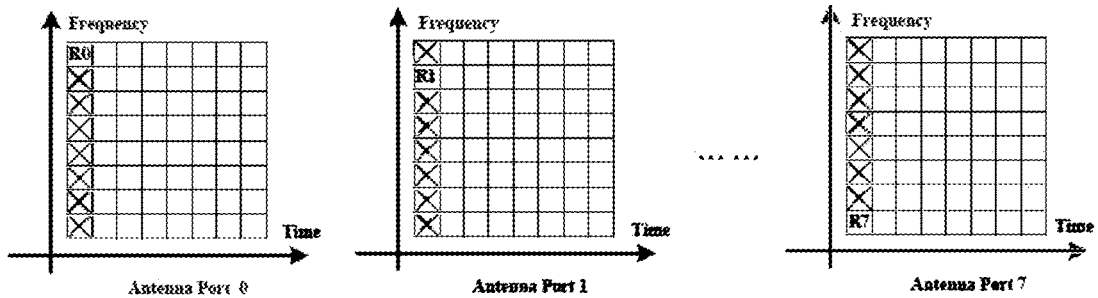
FIG. 3 is a diagram illustrating an example of allocating transmission resources for frequency-domain orthogonal pilot signals in the prior art.

FIG. 3 is a diagram illustrating an example of allocating transmission resources for frequency-domain orthogonal pilot signals in the prior art. As shown in FIG. 3, it is also assumed that the BS is equipped with, for example, 8 antennas and 8 antenna ports correspondingly. Also, the horizontal axis in FIG. 3 represents time, the vertical axis represents frequency, and each block represents a physical resource unit at a certain time and a certain frequency. As shown in FIG. 3, in the case of frequency domain orthogonal pilot signals, different antenna ports transmit pilot signals using different frequencies (i.e., sub-carriers at different frequencies), but these different antenna ports transmit these pilot signals at the same time. For example, antenna ports 0 to 7 may transmit pilot signals using physical resource units R0 to R7 at different frequencies F0 to F7, but at the same time T0, respectively.

Figure 4:
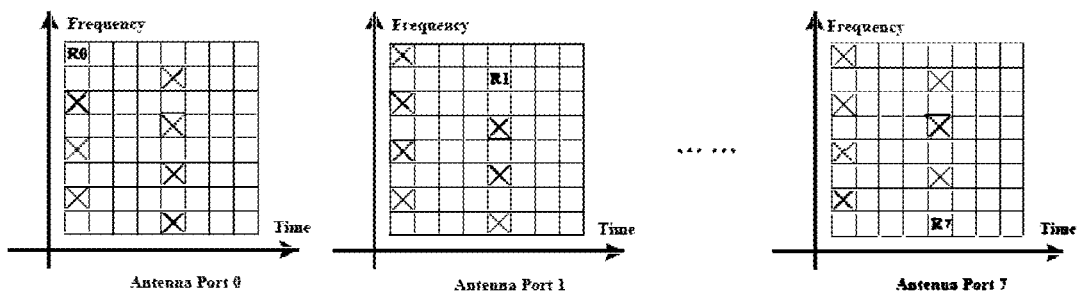
FIG. 4 is a diagram illustrating an example of allocating transmission resources for time-frequency two-dimensional orthogonal pilot signals in the prior art.

FIG. 4 is a diagram illustrating an example of allocating transmission resources for time-frequency two-dimensional orthogonal pilot signals in the prior art. As shown in FIG. 4, it is also assumed that the BS is equipped with, for example, 8 antennas and 8 antenna ports correspondingly. Also, the horizontal axis in FIG. 4 represents time, the vertical axis represents frequency, and each block represents a physical resource unit at a certain time and a certain frequency. As shown in FIG. 4, in the case of time-frequency two-dimensional orthogonal pilot signals, different antenna ports use different time-frequency two-dimensional physical resource units to transmit pilot signals, that is, physical resource units used by different antenna ports to transmit the pilot signals are different at least in time or frequency. For example, antenna port 0 may transmit the pilot signal using physical resource unit R0 at frequency F7 and time T0, antenna port 1 may transmit the pilot signal using physical resource unit RI at frequency F6 and time T4 . . . , and antenna port 7 may transmit the pilot signal using the physical resource unit R7 at frequency F0 and time T4.

Figure 5:
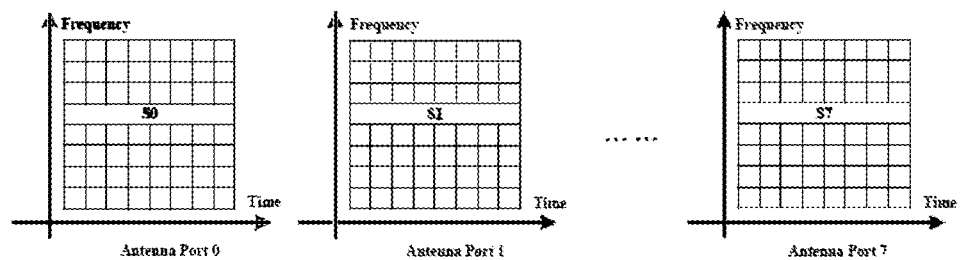
FIG. 5 is a diagram illustrating an example of allocating transmission resources for code orthogonal pilot signals in the prior art.

FIG. 5 is a diagram illustrating an example of assigning transmission resources for code orthogonal pilot signals in the prior art; As shown in FIG. 5, it is also assumed that the BS is equipped with, for example, 8 antennas and 8 antenna ports correspondingly. Also, the horizontal axis in FIG. 5 represents time, the vertical axis represents frequency, and each block represents a physical resource unit at a certain time and a certain frequency. As shown in FIG. 5, in the case of code orthogonal pilot signals, different antenna ports transmit pilot signals that are orthogonal to each other. For example, antenna ports 0 to 7 transmit pilot signals S0 to S7 that are orthogonal to each other respectively.

However, in the various forms of orthogonal pilot signals such as time domain orthogonal pilot signals, frequency domain orthogonal pilot signals, time-frequency two-dimensional orthogonal pilot signals, and code orthogonal pilot signals as described above, the number of physical resource units required to transmit the pilot signals is the same as the number of the antennas or antenna ports. For example, when the BS is equipped with 8 antennas, 8 physical resource units are required to transmit the pilot signals no matter which one of time domain orthogonal pilot signals, frequency domain orthogonal pilot signals, time-frequency two-dimensional orthogonal pilot signals, and code orthogonal pilot signals is used. Therefore, as the number of antennas increases, the number of physical resource units required to transmit pilot signals also increases. Therefore, in the case where multiple antennas are provided for a UE or a BS, as the number of antennas increases, the overhead of channel estimation increases, thereby greatly limiting the data throughput rate of the communication system.

2. SCHEMATIC CONFIGURATION OF AN ELECTRONIC DEVICE ACCORDING TO AN EMBODIMENT OF THE PRESENT DISCLOSURE

Figure 6:
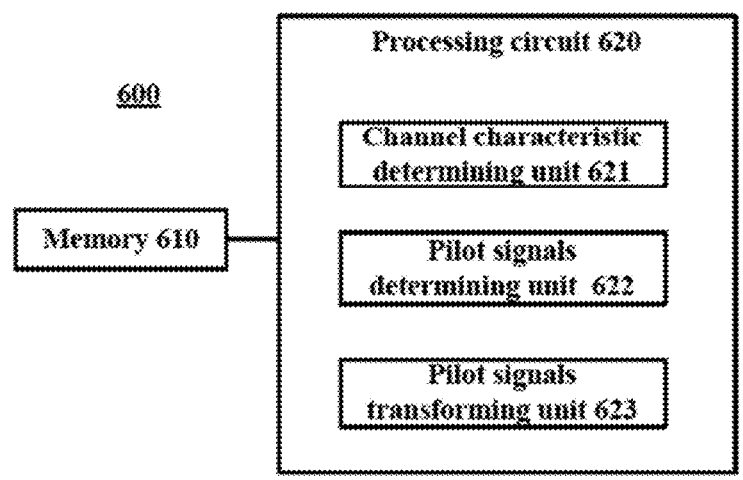
FIG. 6 is a block diagram illustrating the configuration of an electronic device used for a first communication apparatus having multiple antennas according to an embodiment of the present disclosure.

FIG. 6 is a block diagram illustrating the configuration of an electronic device 600 used for a first communication apparatus having multiple antennas according to an embodiment of the present disclosure.

The electronic device 600 for the first communication apparatus having multiple antennas according to the embodiment of the present disclosure may include, for example, a processing circuit 620 and a memory 610.

The processing circuit 620 of the electronic device 600 for the first communication apparatus having multiple antennas is configured to provide various functions for the electronic device 600 that is used for the first communication apparatus having multiple antennas. For example, in the embodiment of the present disclosure, the processing circuit 620 of the electronic device 600 for the first communication apparatus having multiple antennas may include a channel characteristic determining unit 621, a pilot signal determining unit 622, and a pilot signal transforming unit 623. The channel characteristic determining unit 621 may be configured to determine, based on channel states of channels between multiple antennas of the first communication apparatus and a second communication apparatus, channel characteristics of a first channel from the first communication apparatus to the second communication apparatus in the angle domain. The pilot signal determining unit 622 may be configured to determine a first set of pilot signals used in the angle domain based on the determined channel characteristics of the first channel in the angle domain, the pilot signals in the first set of pilot signals being orthogonal to each other. The pilot signal transforming unit 623 may be configured to transform the first set of pilot signals into a second set of pilot signals for transmission over the multiple antennas of the first communication apparatus.

In addition, the electronic device 600 for the first communication apparatus having multiple antennas may also include, for example, multiple antennas. These multiple antennas may be configured to transmit the second set of pilot signals.

According to one embodiment of the present disclosure, the first communication apparatus may be a BS and the second communication apparatus may be a UE. According to another embodiment of the present disclosure, the first communication apparatus may be a UE and the second communication apparatus may be a BS. It should be noted that the communication system to which the present disclosure is applied is, for example, an LTE system, and the BS may send, for example, channel state information reference signals (CSI-RS) or the like adopted in the LTE system as pilot signals, reference sequences, training sequences, etc. However, the technical solution of the present disclosure is not limited to the LTE system. In different communication systems, for example, in a future 5G communication system, the BS may send other pilot signals, reference sequences, training sequences, etc suitable for channel estimation.

The memory 610 may store information generated by the processing circuit 620 and programs and data operated by the electronic device 600 used for the first communication apparatus having multiple antennas. The memory 610 may be volatile memory and/or non-volatile memory. For example, the memory 610 may include, but is not limited to, random access memory (RAM), dynamic random access memory (DRAM), static random access memory (SRAM), read-only memory (ROM), and flash memory.

Figure 7:
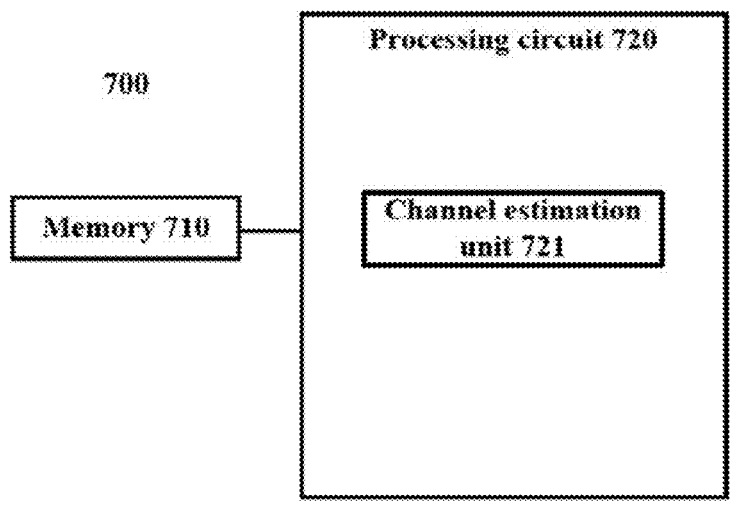
FIG. 7 is a block diagram illustrating the configuration of an electronic device used for a second communication apparatus according to the embodiment of the present disclosure.

FIG. 7 is a block diagram illustrating the configuration of an electronic device 700 used for a second communication apparatus according to the embodiment of the present disclosure.

The electronic device 700 for the second communication apparatus according to the embodiment of the present disclosure may include, for example, a processing circuit 720 and a memory 710.

The processing circuit 720 of the electronic device 700 used for the second communication apparatus is configured to provide various functions for the electronic device 700 that is used for the second communication apparatus. For example, the processing circuit 720 of the electronic device 700 for the second communication apparatus may include a channel estimation unit 721. The channel estimation unit 721 may be configured to perform channel estimation on a first channel from a first communication apparatus having multiple antennas to the second communication apparatus based on a second set of pilot signals from the first communication apparatus, wherein the second set of pilot signal is determined by the first communication apparatus through the following processes: determining, based on channel states of channels between the multiple antennas of the first communication apparatus and the second communication apparatus, channel characteristics of a first channel from the first communication apparatus to the second communication apparatus in the angle domain; based on the determined channel characteristics of the first channel in the angle domain, determining a first set of pilot signals used in the angle domain, the pilot signals in the first set of pilot signals being orthogonal to each other; and transforming the first set of pilot signals into the second set of pilot signals for transmission over the multiple antennas of the first communication apparatus. In addition, the processing circuit 720 may further include a generating unit (not shown) configured to generate a feedback report about a channel estimation result based on the second set of pilot signals to provide the channel estimation result to the first communication apparatus.

According to one embodiment of the present disclosure, the first communication apparatus may be a BS and the second communication apparatus may be a UE. According to another embodiment of the present disclosure, the first communication apparatus may be a UE and the second communication apparatus may be a BS. It should be noted that the communication system to which the present disclosure is applied is, for example, an LTE system, and the BS may send, for example, channel state information reference signals (CSI-RS) or the like adopted in the LTE system as pilot signals, reference sequences, training sequences, etc. However, the technical solution of the present disclosure is not limited to the LTE system, and in different communication systems, the BS may transmit other suitable pilot signals, reference sequences, training sequences, etc.

The memory 710 may store information generated by the processing circuit 720 and programs and data operated by the electronic device 700 used for the second communication apparatus. The memory 710 may be volatile memory and/or non-volatile memory. For example, the memory 710 may include, but is not limited to, random access memory (RAM), dynamic random access memory (DRAM), static random access memory (SRAM), read-only memory (ROM), and flash memory.

3. PROCESS FLOW ACCORDING TO AN EMBODIMENT OF THE PRESENT DISCLOSURE

Figure 8:
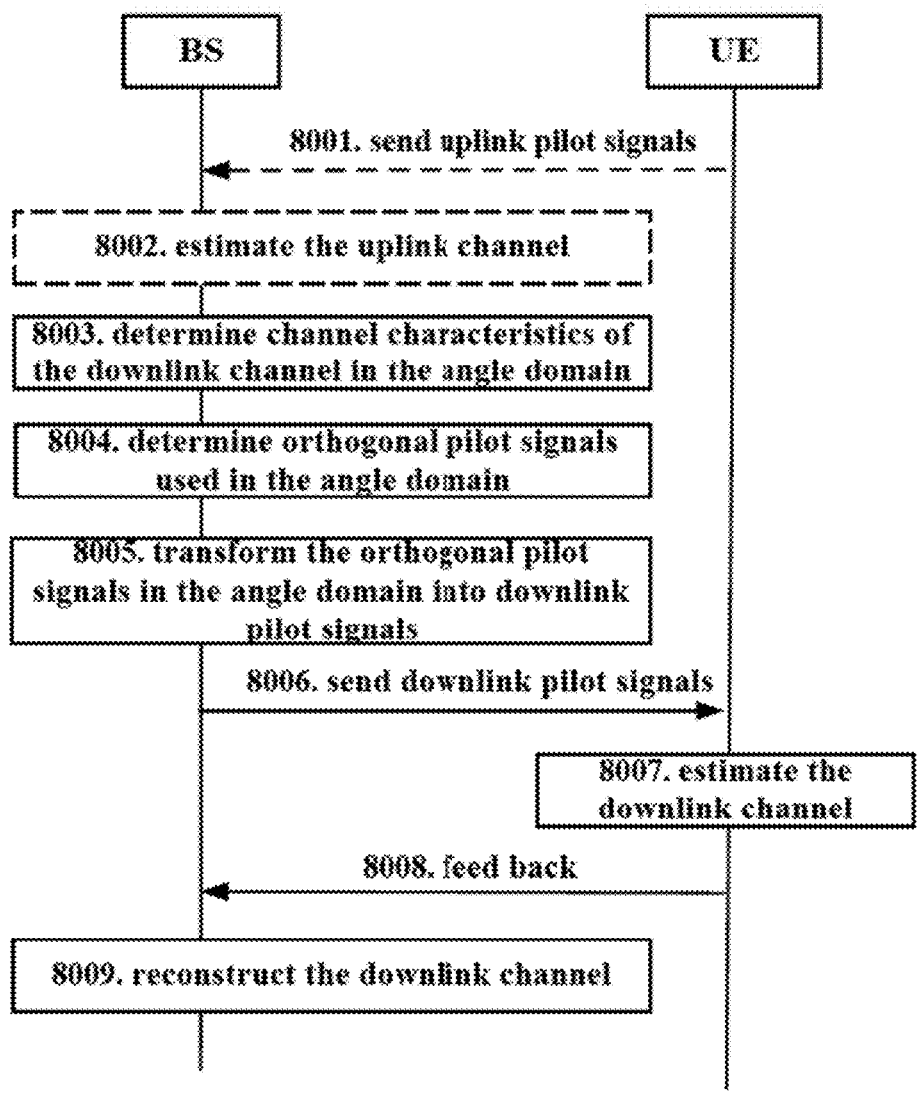
FIG. 8 is a flowchart illustrating an example of a signaling interaction procedure performed between a BS and a UE according to the embodiment of the present disclosure.

FIG. 8 is a flowchart illustrating an example of a signaling interaction procedure performed between a BS and a UE according to an embodiment of the present disclosure.

As shown in FIG. 8, in step 8003, based on channel states of channels between multiple antennas of a first communication apparatus (e.g., a BS) and a second communication apparatus (e.g., a UE), channel characteristics of a first channel (e.g., a downlink channel) from the first communication apparatus (e.g., a BS) to the second communication apparatus (e.g., a UE) in the angle domain are determined.

According to one embodiment of the present disclosure, based on symmetry of antenna angles of arrival in a first channel (e.g., a downlink channel) and a second channel (e.g., an uplink channel) between the first communication apparatus (e.g., a BS) and the second communication apparatus (e.g., a UE), channel characteristics of the first channel (e.g., the downlink channel) in the angle domain can be determined from the channel state of the second channel (e.g., the uplink channel).

The applicant has noted that although the uplink and downlink channels in the FDD system are no longer reciprocal, according to the channel model provided in WINNER II (see IST-4-027756 WINNER II D1.1.2 V1.2 WINNER II Channel Models, Part 1, Channel Model, section 5.4.3), small-scale fading parameters (such as, the antenna angle of arrival) of the uplink and downlink channels are the same. Specifically, the downlink channel $H^{DL} \in \mathbb{C}^{M \times 1}$ and the uplink channel $H^{UL} \in \mathbb{C}^{M \times 1}$ may be respectively represented as follows:

$$h^{DL} = \sqrt{\frac{M}{N_{cl}N_{ray}}} \sum_{i=1}^{N_{cl}} \sum_{l=1}^{N_{ray}} \alpha_{i,l} e^{j\psi_{i,l}^{DL}} a^{DL}(\phi_{i,l}, \theta_{i,l})$$

$$h^{UL} = \sqrt{\frac{M}{N_{cl}N_{ray}}} \sum_{i=1}^{N_{cl}} \sum_{l=1}^{N_{ray}} \alpha_{i,l} e^{j\psi_{i,l}^{UL}} a^{UL}(\phi_{i,l}, \theta_{i,l})$$

wherein, M represents the number of antennas provided for the BS, M is a natural number greater than or equal to 1, $N_{cl}$ is the number of scatterers, $N_{ray}$ is the number of sub-paths included in each scatterer, and $\alpha_{i,1}$ represents the channel coefficient of each sub-path, a denotes the antenna response vector of the BS, the superscripts UL and DL represent the uplink channel and the downlink channel, respectively, and φ and θ are the antenna angles of arrival in the horizontal direction and the vertical direction, respectively. In addition, $\psi_{i,1}^{DL}$ and $\psi_{i,1}^{UL}$ denote random phases of each sub-path in the uplink channel and the downlink channel, which are independently and uniformly distributed in [0, 2π].

Further, the form of the antenna response vector depends on the type of the antennas provided for the BS. For example, in the case where all the antennas provided for the BS are Uniform Linear Array (ULA) antennas, the antenna response vector can be represented as follows:

$$a_{ULA}(\phi) = \frac{1}{\sqrt{M}}\left[1, e^{j\frac{2\pi d}{\lambda}\sin(\phi)}, \dots, e^{j(M-1)\frac{2\pi d}{\lambda}\sin(\phi)}\right]^T$$

Note that in the above expression, wavelengths $\lambda^{UL}$ and $\lambda^{DL}$ may be used for the uplink and downlink channels, respectively.

As another example, in the case where all the antennas provided for the BS are Uniform Planar Array (UPA) antennas, provided that the numbers of antennas in the horizontal direction and the vertical direction are W and H, respectively, and W×H=M, M representing the number of antennas provided for the BS, wherein W, H and M all are natural numbers greater than or equal to 1, the antenna response vector may have a form of Kronecker product, and may be expressed as follows:

$$a_{UPA}(\phi,\theta) = \text{vec}(a_v(\theta) \otimes a_h(\phi,\theta))$$

Wherein, $a_v(\theta)$ and $a_h(\phi,\theta)$ are the antenna response vectors in the vertical and horizontal directions respectively, $a_v(\theta)$ and $a_h(\phi,\theta)$ can be respectively expressed as:

$$a_v(\theta) = \left[1, e^{j\frac{2\pi d}{\lambda}\cos(\theta)}, \dots, e^{j\frac{2\pi d}{\lambda}(H-1)\cos(\theta)}\right]^T \in \mathbb{C}^{H \times 1}$$

$$a_h(\phi,\theta) = \left[1, e^{j\frac{2\pi d}{\lambda}\sin(\phi)\sin(\theta)}, \dots, e^{j\frac{2\pi d}{\lambda}(W-1)\sin(\phi)\sin(\theta)}\right]^T \in \mathbb{C}^{1 \times W}$$

Similarly, in the above expression, wavelengths $\lambda^{UL}$ and $\lambda^{DL}$ may be used for the uplink and downlink channels, respectively.

Thus, due to the reciprocity of the antenna angles of arrival of the uplink channel and the downlink channel, channel characteristics of the downlink channel in the angle domain can be determined from the channel state of the uplink channel.

Specifically, channel states of channels between the multiple antennas of a first communication apparatus (e.g., a BS) and a second communication apparatus (e.g., a UE) corresponds to channel states of channels from the second communication apparatus (e.g., a UE) to the multiple antennas of the first communication apparatus (e.g., a BS). In addition, the channel characteristic determining unit 621 in the processing circuit 620 of the electronic device 600 used for the first communication apparatus having multiple antennas may be further configured to: based on channel states of channels from the second communication apparatus (e.g., a UE) to the multiple antennas of the first communication apparatus (e.g., a BS), determine channel characteristics of a second channel (e.g., an uplink channel) from the second communication apparatus (e.g., a UE) to the first communication apparatus (e.g., a BS) in the angle domain, and determine channel characteristics of a first channel (e.g., a downlink channel) in the angle domain based on the channel characteristics of the second channel (e.g., an uplink channel) in the angle domain.

Return back to step 8001 and step 8002 in FIG. 8. Steps 8001 and 8002 in FIG. 8 are optional steps.

In step 8001, uplink pilot signals may be transmitted from the UE to the BS.

In step 8002, the uplink channel may be estimated according to the uplink pilot signals transmitted from the UE to the BS to determine channel state of the uplink channel.

Once the channel states of channels between the multiple antennas of the first communication apparatus (e.g., a BS) and the second communication apparatus (e.g., a UE) is obtained, a transformation may be performed on the channel states of channels between the multiple antennas of the first communication apparatus (e.g., a BS) and the second communication apparatus (e.g., a UE) to obtain channel characteristics of corresponding channels in the angle domain. For example, once the channel state of the uplink channel from the UE to the BS is obtained, the channel state of the uplink channel from the UE to the BS may be transformed to obtain channel characteristics of the uplink channel from the UE to the BS in the angle domain.

According to an embodiment of the present disclosure, N angles at which the channel characteristics are significant are selected from the angle domain based on channel characteristics of corresponding channels in the angle domain, where N is a natural number greater than or equal to 1, the number of pilot signals in the first set of pilot signals is greater than or equal to N, and the first set of pilot signals are used for the N angles, respectively.

For example, based on the channel characteristics of the uplink channel from the UE to the BS in the angle domain, N angles at which the channel characteristics are significant can be selected from the angle domain, where N is a natural number greater than or equal to 1. According to an embodiment of the present disclosure, the number of the first set of pilot signals may be greater than or equal to N, and the first set of pilot signals are used for the N angles, respectively. For example, in the case of a communication system having only one UE, the number of pilot signals in the first set of pilot signals may be equal to N. For another example, in the case of a communication system having two or more UEs, the number of pilot signals in the first set of pilot signals may be greater than N.

Specifically, according to the embodiment of the present disclosure, it can be determined whether the channel characteristics of a corresponding channel in the angle domain have an amplitude value satisfying a predetermined condition; and N angles at which the amplitude values of the channel characteristics satisfy the predetermined condition are selected as the N angles at which the channel characteristics are significant.

For example, it can be determined whether the channel characteristics of the uplink channel from the UE to the BS in the angle domain have amplitude values satisfying the predetermined condition, and N angles at which the amplitude values of the channel characteristics satisfy the predetermined condition are selected as the N angles at which the channel characteristics are significant.

Specifically, according to the embodiment of the present disclosure, it is possible to select the top N angles at which the channel characteristics of the corresponding channels in the angle domain have larger amplitude values as the N angles at which the channel characteristics are significant.

For example, the top N angles at which the channel characteristics of the uplink channel from the UE to the BS in the angle domain have larger amplitude values may be selected as the N angles at which the channel characteristics are significant.

The embodiment of the present disclosure described above can bring about some beneficial technical effects. For example, since uplink channel estimation is a step required for uplink data transmission in a mobile communication system, determining the channel characteristics of the downlink channel in the angle domain from the channel state of the uplink channel does not bring about extra resource consumption.

According to still another embodiment of the present disclosure, channel states of channels between a plurality of antennas of a first communication apparatus (e.g., a BS) and a second communication apparatus (e.g., a UE) corresponds to channel states of channels from the multiple antennas of the first communication apparatus (e.g., a BS) to the second communication apparatus (e.g., a UE). In addition, the channel characteristic determination unit 621 in the processing circuit 620 of the electronic device 600 used for the first communication apparatus having multiple antennas may also be configured to: based on channel states of channels from the multiple antennas of the first communication apparatus (e.g., a BS) to the second communication apparatus (e.g., a UE), determine channel characteristics of a first channel (e.g., the downlink channel) in the angle domain.

Specifically, channel estimation of the first channel (e.g., the downlink channel) from the first communication apparatus (e.g., a BS) to the second communication apparatus (e.g., a UE) may be performed periodically using conventional orthogonal pilot signals, and according to channel state of the first channel (e.g., the downlink channel) fed back from the second communication apparatus (e.g., a UE) to the first communication apparatus (e.g., a BS), channel characteristics of the first channel (e.g., the downlink channel) from the first communication apparatus (e.g., a BS) to the second communication apparatus (e.g., a UE) in the angle domain are determined. Below, an example of a process flow of determining channel characteristics of a channel between a BS and a UE in the angle domain will be described in detail with reference to FIG. 10.

Figure 10:
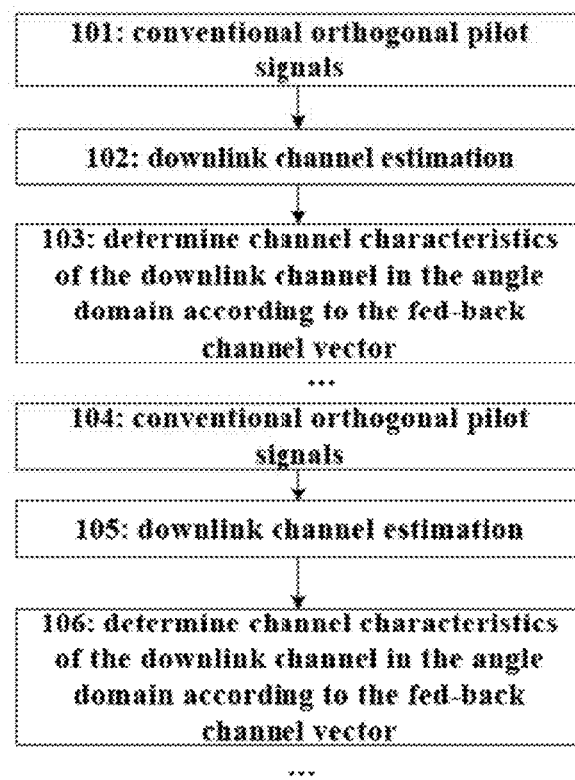
FIG. 10 is a diagram illustrating an example of a process flow of determining channel characteristics of a channel between a BS and a UE in the angle domain according to the embodiment of the present disclosure.

FIG. 10 is a diagram illustrating an example of a process flow of determining channel characteristics in the angle domain of a channel between a BS and a UE according to an embodiment of the present disclosure.

As shown in FIG. 10, in step 101, conventional orthogonal pilot signals are designed using a conventional orthogonal pilot design method. For example, the time domain orthogonal pilot signals shown in FIG. 2, the frequency domain orthogonal pilot signals shown in FIG. 3, the time-frequency two-dimensional orthogonal pilot signals shown in FIG. 4, or the code orthogonal pilot signals shown in FIG. 5 may be used.

In step 102, conventional orthogonal pilot signals are transmitted from the BS to the UE, and a channel state fed back from the UE is received to determine the downlink channel. That is, downlink channel estimation is performed using conventional orthogonal pilot signals to obtain the fed-back channel state of the downlink channel.

In step 103, channel characteristics of the downlink channel from the BS to the UE in the angle domain may be determined according to the channel state of the downlink channel fed back from the UE to the BS.

It should be noted that the above embodiments exemplarily show two methods of determining channel characteristics of a first channel (e.g., a downlink channel) from a first communication apparatus (e.g., a BS) to a second communication apparatus (e.g., a UE) in the angle domain. However, the present disclosure is not limited to the above two methods, and other methods may also be used to determine channel characteristics of a first channel (e.g., a downlink channel) from a first communication apparatus (e.g., a BS) to a second communication apparatus (e.g., a UE) in the angle domain.

Once channel states of channels between multiple antennas of the first communication apparatus (e.g., a BS) and the second communication apparatus (e.g., a UE) are obtained, a transformation may be performed on the channel states of the channels between the multiple antennas of the first communication apparatus (e.g., a BS) and the second communication apparatus (e.g., a UE) to obtain channel characteristics of corresponding channels in the angle domain. For example, once a channel state of the downlink channel from the BS to the UE is obtained, the channel state of the downlink channel from the BS to the UE may be transformed to obtain channel characteristics of the downlink channel from the BS to the UE in the angle domain.

According to an embodiment of the present disclosure, N angles at which channel characteristics are significant are selected from the angle domain based on the channel characteristics of corresponding channels in the angle domain, where N is a natural number greater than or equal to 1, the number of pilot signals in the first set of pilot signals is greater than or equal to N, and the first set of pilot signals are used for the N angles, respectively.

For example, based on channel characteristics of the downlink channel from the BS to the UE in the angle domain, the N angles at which channel characteristics are significant can be selected from the angle domain, where N is a natural number greater than or equal to 1, the number of the first set of pilot signals is greater than or equal to N, and the first set of pilot signals are used for the N angles, respectively.

Specifically, according to the embodiment of the present disclosure, it can be determined whether channel characteristics of corresponding channels in the angle domain have amplitude values satisfying a predetermined condition; and N angles at which the amplitude values of the channel characteristics satisfy the predetermined condition are selected as the N angles at which the channel characteristics are significant.

For example, it can be determined whether channel characteristics of downlink channels from the BS to the UE in the angle domain have amplitude values satisfying the predetermined condition, and N angles at which the amplitude values of the channel characteristics satisfy the predetermined condition are selected as the N angles at which the channel characteristics are significant.

Specifically, according to the embodiment of the present disclosure, it is possible to select the top N angles at which the channel characteristics of the corresponding channels in the angle domain have larger amplitude values as the N angles at which the channel characteristics are significant.

For example, the top N angles at which the channel characteristics of the downlink channel from the BS to the UE in the angle domain have larger amplitude values may be selected as the N angles at which the channel characteristics are significant.

After a preset period, operations of steps 104 to 106 that are the same as the operations of steps 101 to 103 are repeatedly performed, whose detail will not be repeated herein. It should be noted that a period for transmitting conventional orthogonal pilot signals depends on a changing rate of a channel. For example, the period for transmitting the conventional orthogonal pilot signals may be set to several times a channel coherence time.

In the embodiments of the present disclosure described above, the value of N is determined based on angular spread status of the channels between the multiple antennas of the first communication apparatus (e.g., a BS) and the second communication apparatus (e.g., a UE), the number of antennas of the first communication apparatus (e.g., a BS) and/or the number of available pilot signals.

More specifically, the value of N is directly proportional to the angular spread status of the channels between the multiple antennas of the first communication apparatus (e.g., a BS) and the second communication apparatus (e.g., a UE), the number of antennas of the first communication apparatus (e.g., a BS) and/or the number of available pilot signals.

For example, the value of N may be $$\left\lceil \frac{2\sigma}{180} M \right\rceil \text{ or } \left\lceil \frac{4\sigma}{180} M \right\rceil,$$

where σ is the standard deviation of angular spread status of channels between the multiple antennas of the first communication apparatus (e.g., a BS) and the second communication apparatus (e.g., a UE), M is the number of antennas of the first communication apparatus (e.g., a BS), "[•]" denotes rounding operation.

In the above embodiments of the present disclosure, the transformation performed on channel states of channels between the multiple antennas of the first communication apparatus (e.g., a BS) and the second communication apparatus (e.g., a UE) may be based on Fourier transform, so as to achieve a transformation from a wireless physical channel to an angle domain channel. That is, the transformation performed on the channel state of the uplink channel or that of the downlink channel between the BS and the UE may be based on Fourier transform.

More specifically, the transformation described above may be Fast Fourier Transform (FFT), and a transformation matrix adopted by FFT is determined based on the type of the multiple antennas of the first communication apparatus (e.g., a BS).

According to an embodiment of the present disclosure, if multiple antennas of the first communication apparatus (e.g., a BS) are antennas in a uniform linear array, the transformation matrix adopted by FFT is an M×M discrete Fast Fourier transformation matrix, where M is the number of antennas of the first communication apparatus (e.g., a BS), and M is a natural number greater than or equal to 1.

For example, an element of the p-th row and the q-th column in the above M×M discrete Fast Fourier transformation matrix F can be expressed as:

$$[F]_{p,q} = \frac{1}{\sqrt{M}} \times e^{-j2\pi \frac{(p-1)(q-1)}{M}}$$

According to an embodiment of the present disclosure, if the multiple antennas of the first communication apparatus (e.g., a BS) are antennas in a uniform planar array, the transformation matrix adopted by FFT is FW⊗FH, where FW is a W×W discrete Fast Fourier transformation matrix, and FH is a H×H discrete Fast Fourier transformation matrix, ⊗ denotes Kronecker product, W and H represent the numbers of antennas of the first communication apparatus (e.g., a BS) in the horizontal and vertical directions respectively, which satisfy W×H=M, in which M is the number of antennas of the first communication apparatus (e.g., a BS), and M, W, and H all are natural numbers greater than or equal to 1.

For example, an element of the p-th row and q-th column in the W×W discrete Fast Fourier transformation matrix $F_W$ may be:

$$[F_W]_{p,q} = \frac{1}{\sqrt{W}} \times e^{-j2\pi\frac{(p-1)(q-1)}{W}}$$

Similarly, for example, an element of the p-th and q-th columns in the H×H discrete Fast Fourier transformation matrix $F_H$ may be:

$$[F_H]_{p,q} = \frac{1}{\sqrt{H}} \times e^{-j2\pi\frac{(p-1)(q-1)}{H}}$$

In addition, in the embodiment described above with reference to steps 801 and 802 in FIG. 8, that is, in the case that the channel states of the channels between the multiple antennas of the first communication apparatus (e.g., a BS) and the second communication apparatus (e.g., a UE) correspond to the channel states of the channels from the second communication apparatus (e.g., a UE) to the first communication apparatus (a BS), indexes of N angles at which channel characteristics of the second channel (e.g., the uplink channel) in the angle domain are significant may be corrected based on an offset between transmission frequencies of a first channel (e.g., a downlink channel) and a second channel (e.g., an uplink channel), to determine indexes of N angles at which channel characteristics of the first channel (e.g., the downlink channel) in the angle domain are significant.

In addition, according to an embodiment of the present disclosure, if the offset between the transmission frequencies of the first channel (e.g., the downlink channel) and the second channel (e.g., the uplink channel) does not satisfy a predetermined correction condition, the indexes of the N angles at which the channel characteristics of the second channel (e.g., the uplink channel) in the angle domain are significant are directly determined as the indexes of the N angles at which the channel characteristics of the first channel (e.g., the downlink channel) in the angle domain are significant.

According to an embodiment of the present disclosure, the above described predetermined correction condition may also depend on the type of the multiple antennas of the first communication apparatus (e.g., a BS).

For example, according to an embodiment of the present disclosure, if the multiple antennas of the first communication apparatus (e.g., a BS) are antennas in a uniform linear array, it is determined whether an offset between the transmission frequencies of the first channel (e.g., the downlink channel) and the second channel (e.g., the uplink channel) satisfies, for example, the following predetermined correction condition:

$$\Delta f \times M > f_1$$

Where, $\Delta f$ is the absolute value of the difference between the transmission frequency $f_1$ of the first channel (e.g., the downlink channel) and the transmission frequency $f_2$ of the second channel (e.g., the uplink channel), and M is the number of antennas of the first communication apparatus (e.g., a BS), M is a natural number greater than or equal to 1.

As another example, according to an embodiment of the present disclosure, if the multiple antennas of the first communication apparatus (e.g., a BS) are antennas in a uniform planar array, it is determined whether an offset between the transmission frequencies of the first channel (e.g., the downlink channel) and the second channel (e.g., the uplink channel) satisfies, for example, the following predetermined correction condition:

$$\Delta f \times \max(W,H) > f_1$$

Where, $\Delta f$ is the absolute value of the difference between the transmission frequency f1 of the first channel (e.g., the downlink channel) and the transmission frequency f2 of the second channel (e.g., the uplink channel), W and H represent the numbers of antennas of the first communication apparatus (for example, base station) in the horizontal direction and the vertical direction respectively, and satisfy W×H=M, in which M is the number of antennas of the first communication apparatus (e.g., BS), M, W, and H all are natural numbers greater than or equal to 1, and max(W, H) is the maximum of W and H.

According to an embodiment of the present disclosure, the above correction performed on the indexes of the N angles at which the channel characteristics of the second channel (e.g., the uplink channel) in the angle domain are significant may depend on the type of the multiple antennas of the first communication apparatus (e.g., a BS).

For example, according to an embodiment of the present disclosure, if the multiple antennas of the first communication apparatus (e.g., a BS) are antennas in a uniform linear array, the indexes of the N angles at which the channel characteristics of the second channel (for example, the uplink channel) in the angle domain are significant can be corrected according to, for example, the following equation:

$$p_i^1 = \begin{cases} \left[\frac{\lambda^2}{\lambda^1} p_i^2\right], & 0 \leq p_i^2 < \frac{M}{2} \\ \left[M - \frac{\lambda^2}{\lambda^1}(M - p_i^2)\right], & \frac{M}{2} \leq p_i^2 < M \end{cases}$$

where $p_i^1$ is the index of i-th angle among the N angles at which channel characteristics of the first channel (e.g., the downlink channel) in the angle domain are significant, and $p_i^2$ is the index of i-th angle among the N angles at which channel characteristics of the second channel (e.g., the uplink channel) in the angle domain are significant, i is a natural number greater than or equal to 1, $1 \leq i \leq N$, $\lambda^1$ and $\lambda^2$ are transmission wavelengths of the first channel (e.g., the downlink channel) and the second channel (e.g., the downlink channel), respectively, M is the number of antennas of the first communication apparatus (e.g., a BS), and [•] denotes rounding operation.

As another example, according to an embodiment of the present disclosure, if the multiple antennas of the first communication apparatus (e.g., a BS) are antennas in a uniform planar array, the indexes of the N angles at which channel characteristics of the second channel (for example, the uplink channel) in the angle domain are significant can be corrected according to, for example, the following equation:

$$x_i^1 = \begin{cases} \left[\frac{\lambda^2}{\lambda^1}x_i^2\right], & 0 \le x_i^2 < \frac{W}{2} \\ \left[W - \frac{\lambda^2}{\lambda^1}(W - x_i^2)\right], & \frac{W}{2} \le x_i^2 < W \end{cases}$$

$$y_i^1 = \begin{cases} \left[\frac{\lambda^2}{\lambda^1}y_i^2\right], & 0 \le y_i^2 < \frac{H}{2} \\ \left[H - \frac{\lambda^2}{\lambda^1}(H - y_i^2)\right], & \frac{H}{2} \le y_i^2 < H \end{cases}$$

$$p_i^1 = x_i^1 + y_i^1 W$$

where $x_i^1$ and $y_i^1$ are coordinates of the index $p_i^1$ of the i-th angle among the N angles at which channel characteristics of the first channel (e.g., the downlink channel) in the angle domain are significant, $x_i^2$ and $y_i^2$ are coordinates of the index $p_i^2$ of the i-th angle among the N angles at which channel characteristics of the second channel (e.g., the uplink channel) in the angle domain are significant. $x_i^2$=mod $(p_i^2, W)$, $y_i^2 = (p_i^2 - x_i^2)/W$, [•] denotes rounding operation, mod(a,b) denotes an operation for the remainder of a divided by b, W and H respectively denote the numbers of antennas of the first communication apparatus (e.g., a BS) in the horizontal direction and in the vertical direction, and satisfy W×H=M, in which i is a natural number greater than or equal to 1, 1≤i≤N, $\lambda^1$ and $\lambda^2$ are transmission wavelengths of the first channel (e.g., the downlink channel) and the second channel (e.g., the downlink channel) respectively, M is the number of antennas of the first communication apparatus.

In addition, in a scenario where there is no requirement for high accuracy of the system, instead of determining whether the indexes need to be corrected according to the above predetermined correction condition, the indexes of angle domain ports at which channel characteristics of the uplink channel in the angle domain are significant may be directly used as the indexes of angle domain ports at which channel characteristics of the downlink channel in the angle domain are significant.

Below, an example of determining the channel characteristics of the downlink channel in the angle domain from the channel state of the uplink channel will be described with reference to FIGS. 13A, 13B to 15A, and 15B. It is assumed that the number M of antennas provided for the BS is 8, the number K of antennas provided for the UE is 3, the transmission frequency of the downlink channel is $f_1$, the transmission frequency of the uplink channel is $f_2$, and the transmission frequency $f_1$ of the downlink channel and the transmission frequency $f_2$ of the uplink channel satisfy $f_2=0.9*f_1$. In addition, it is also assumed that the antennas provided for the BS are antennas in a uniform linear array.

Figure 13A:
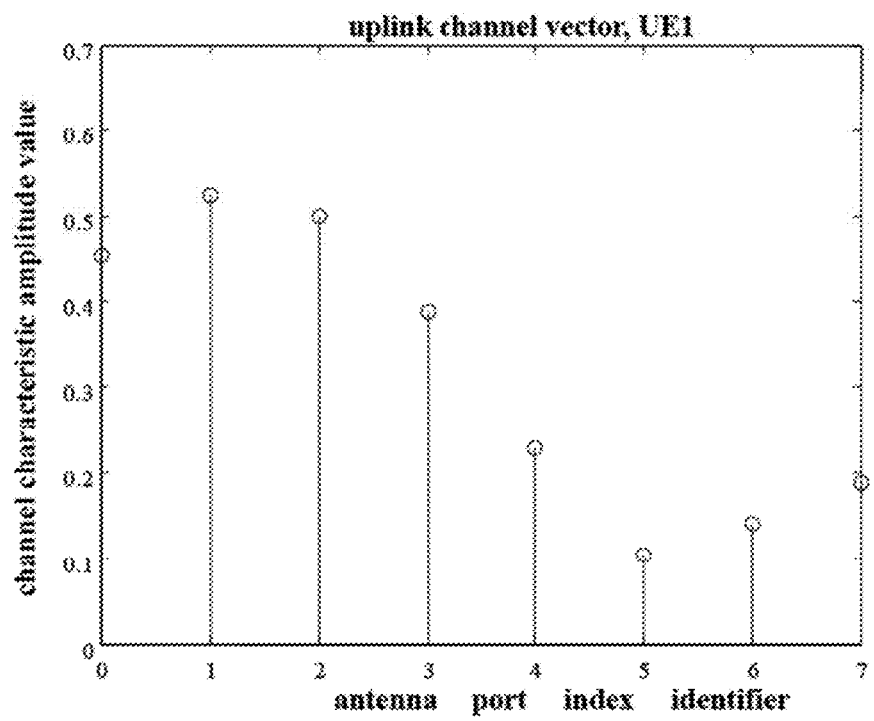
FIG. 13A is a diagram illustrating a channel state of an uplink channel of a first UE according to an embodiment of the present disclosure.

FIG. 13A is a diagram illustrating a channel state of an uplink channel of a first UE according to an embodiment of the present disclosure. As shown in FIG. 13A, the horizontal axis indicates antenna port indexes, and the vertical axis indicates channel characteristic amplitude values. As shown in FIG. 13A, for the uplink channel of the first UE, channel state vector element $U_{10}$ on antenna port 0=(−0.445292748915722−0.0895391682772950i), and its channel characteristic amplitude is 0.454205784741575; channel state vector element $U_{11}$ on antenna port 1=(0.429935240361251−0.301353644108254254i), and its channel characteristic amplitude is 0.525031741632647; channel state vector element $U_{12}$ on antenna port 2=(−0.0772191708737074+0.4935796384426503i), and its chan-nel characteristic amplitude is 0.499583486336028; channel state vector element $U_{13}$ on the antenna port 3=(−0.245440920746513−0.3004079107088885i), and its channel characteristic amplitude is 0.387925454686043; channel state vector element $U_{14}$ on the antenna port 4= (0.227983908018620−0.01968872679967956i), and its channel characteristic amplitude is 0.228832489560040; channel state vector element $U_{15}$ on the antenna port 5= (0.0125163370492662+0.103088869741354i), and its channel characteristic amplitude is 0.103845913533854; channel state vector element $U_{16}$ on the antenna port 6=(−0.125417988465446+0.0645631308891503i), and its channel characteristic amplitude is 0.141060517867078; and channel state vector element $U_{17}$ on the antenna port 7= (0.00129973639612804−0.1868713892251782i), and its channel characteristic amplitude is 0.186875909190004. Therefore, the channel state of the upstream channel of the first UE can be represented as vector $U_1$:

$$U_1 = \begin{bmatrix} U_{10} \\ U_{11} \\ U_{12} \\ U_{13} \\ U_{14} \\ U_{15} \\ U_{16} \\ U_{17} \end{bmatrix}$$

Since it is assumed that the antennas provided for the BS are antennas in a uniform linear array as described above, each element $[F]_{p,q}$ in a 8×8 discrete Fast Fourier Transform matrix F employed by FFT is determined according to the following equation:

$$[F]_{p,q} = e^{-j2\pi\frac{(p-1)(q-1)}{8}}$$

where, p and q both are natural numbers greater than or equal to 1 and less than or equal to 8.

By multiplying the 8×8 discrete Fast Fourier Transform matrix F by the channel state vector $U_1$ of the uplink channel of the first UE, a channel characteristic vector $A_1$ of the uplink channel of the first UE in the angle domain can be obtained. That is, the channel characteristic vector $A_1$ of the uplink channel of the first UE in the angle domain can be expressed as follows:

$$A_1 = F \times U_1 = F \times \begin{bmatrix} U_{10} \\ U_{11} \\ U_{12} \\ U_{13} \\ U_{14} \\ U_{15} \\ U_{16} \\ U_{17} \end{bmatrix} = \begin{bmatrix} A_{10} \\ A_{11} \\ A_{12} \\ A_{13} \\ A_{14} \\ A_{15} \\ A_{16} \\ A_{17} \end{bmatrix}$$

where, $A_{10}$=(−0.0783600203933173−0.0836610560030985i), with an amplitude of 0.114627505807265; $A_{11}$=(−0.0498138727191462−0.157132775443158i), with an amplitude of 0.164839713157204; $A_{12}$=(0.0969948426938652−

0.478698360054164i) with an amplitude of 0.488426165789420; $A_{13}$=(−0.685254134667091+ 0.0224019315173863i) with an amplitude of 0.685620212372749; $A_{14}$=(−0.218586644105906+ 0.401091807756179i), with an amplitude of 0.456787433310726; $A_{15}$=(−0.122904135293104+ 0.0736593438377662i), with an amplitude of 0.143286864041181; $A_{16}$=(−0.107369288214900+ 0.00679603770056940i), with an amplitude of 0.107584153945652; and $A_{17}$=(−0.0941848367864231− 0.0377119415941945i), with an amplitude of 0.101454295223461.

It can be seen that indexes of angle domain ports corresponding to the top 3 channel characteristics of the uplink channel of the first UE in the angle domain with larger amplitude values (0.488426165789420, 0.685620212372749 and 0.456787433310726) are 2, 3 and 4 respectively.

In addition, as it is assumed that the antennas provided for the BS are antennas in a uniform linear array as described above, it can be determined, according to the following predetermined correction condition, whether the indexes (2, 3 and 4) of the three angle domain ports with significant channel characteristics of the uplink channel of the first UE in the angle domain need to be corrected:

$$\Delta f \times M > f_1$$

Since $\Delta f \times M = (f_1 - f_2) \times M = (f_1 - 0.9 f_1) \times 8 = 0.8 f_1 < f_1$ as described above, there is no need to correct the indexes (2, 3 and 4) of the three angle domain ports with significant channel characteristics of the uplink channel of the first UE in the angle domain. That is, the indexes (2, 3 and 4) of the three angle domain ports with significant channel characteristics of the uplink channel of the first UE in the angle domain can be directly determined as indexes (2, 3 and 4) of three angle domain ports with significant channel characteristics of the downlink channel of the first UE in the angle domain.

Further, in a scenario where there is no requirement for high accuracy of the system, instead of determining whether correction needs to be performed according to the above predetermined correction condition, the indexes (2, 3 and 4) of angle domain ports with significant channel characteristics of the uplink channel of the first UE in the angle domain may be directly used as the indexes (2, 3 and 4) of angle domain ports with significant channel characteristics of the downlink channel of the first UE in the angle domain.

Figure 13B:
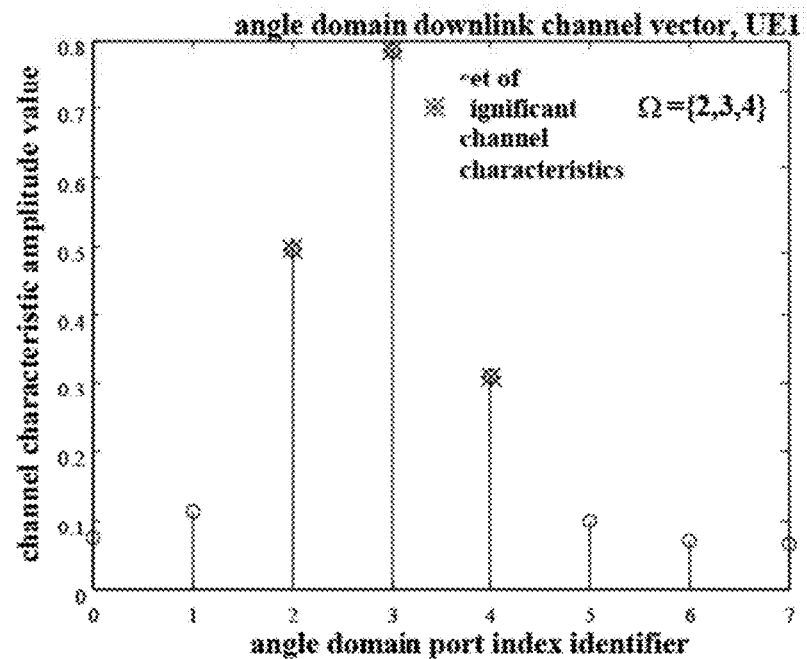
FIG. 13B is a diagram illustrating actual channel characteristics of a downlink channel of a first UE in the angle domain according to an embodiment of the present disclosure.

FIG. 13B is a diagram illustrating the actual channel characteristics of the downlink channel of a first UE in the angle domain according to an embodiment of the present disclosure. As shown in FIG. 13B, the indexes of angle domain ports corresponding to the top 3 channel characteristics with larger amplitude values in the downlink channel of the first UE in the angle domain are also 2, 3 and 4 respectively. Thus, the indexes of angle domain ports corresponding to the top 3 channel characteristics having larger amplitude values in the downlink channel of the first UE in the angle domain calculated in the above manner are consistent with the indexes of angle domain ports corresponding to the top 3 actual channel characteristics having larger amplitude values in the downlink channel of the first UE in the angle domain.

Figure 14A:
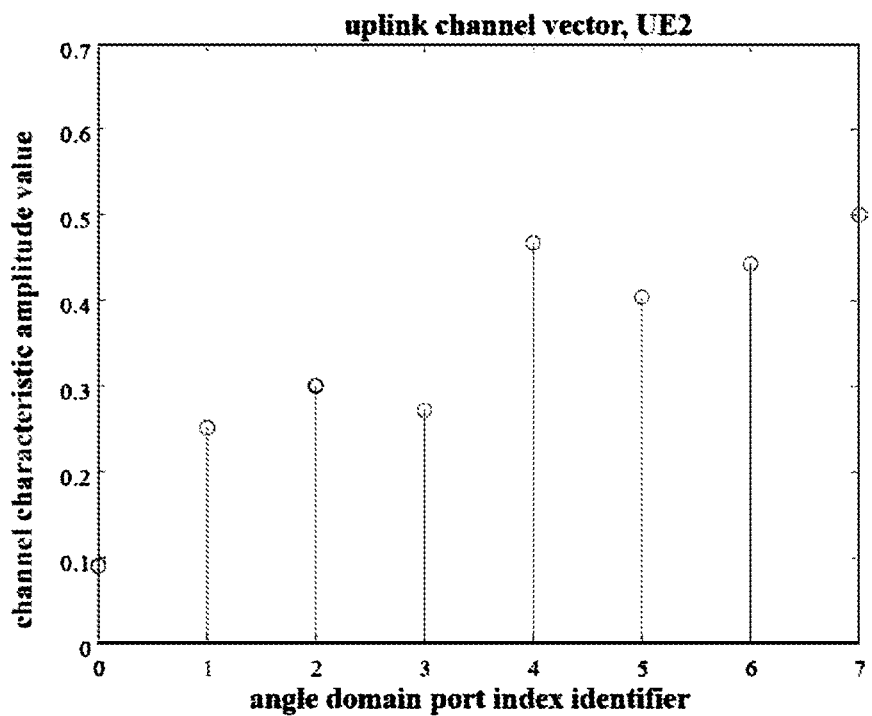
FIG. 14A is a diagram illustrating a channel state of an uplink channel of a second UE according to an embodiment of the present disclosure.
Figure 14B:
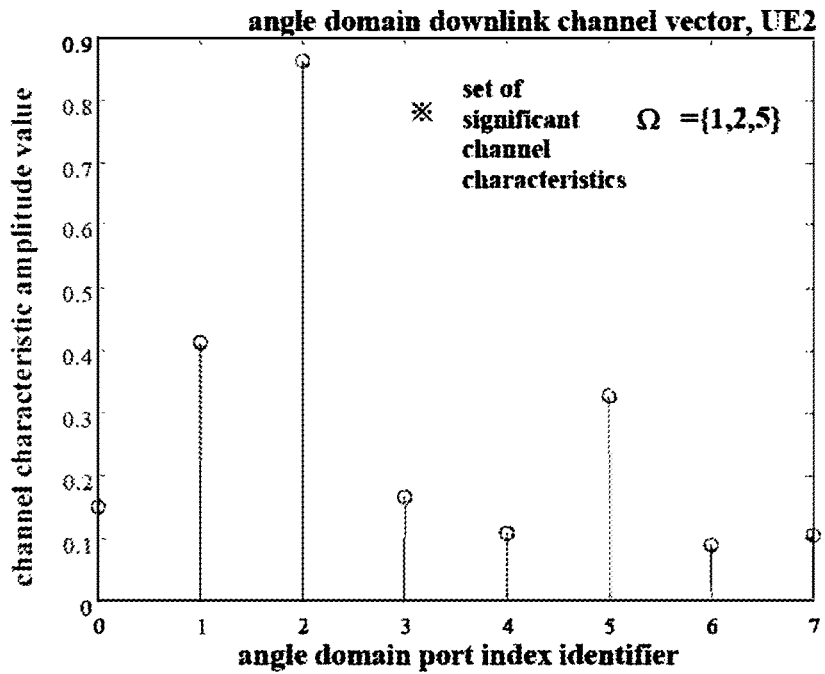
FIG. 14B is a diagram illustrating actual channel characteristics of a downlink channel of a second UE in the angle domain according to an embodiment of the present disclosure.

FIG. 14A is a diagram illustrating a channel state of the uplink channel of a second UE according to an embodiment of the present disclosure. FIG. 14B is a diagram illustrating actual channel characteristics of the downlink channel of the second UE in the angle domain according to an embodiment of the present disclosure. Similar to FIG. 13A, it can be determined that the indexes of angle domain ports corresponding to the top 3 channel characteristics having larger amplitude values in the uplink channel of the second UE in the angle domain are 1, 2 and 5 respectively.

In addition, as it is assumed that the antennas provided for the BS are antennas in a uniform linear array as described above, it can be determined according to the following predetermined correction condition whether the indexes (1, 2 and 5) of the three angle domain ports with significant channel characteristics of the uplink channel of the second UE in the angle domain need to be corrected:

$$\Delta f \times M > f_1$$

As described above, $\Delta f \times M = (f_1 - f_2) \times M = (f_1 - 0.9 f_1) \times 8 = 0.8 f_1 < f_1$, there is no need to correct the indexes (1, 2 and 5) of the three angle domain ports with significant channel characteristics of the uplink channel of the second UE in the angle domain. That is, the indexes (1, 2 and 5) of three angle domain ports with significant channel characteristics of the uplink channel of the second UE in the angle domain can be directly determined as the indexes (1, 2 and 5) of three angle domain ports with significant channel characteristics of the downlink channel of the second UE in the angle domain.

Further, similarly, in a scenario where there is no requirement for high accuracy of the system, instead of determining whether correction needs to be performed according to the above predetermined correction condition, the indexes (1, 2 and 5) of angle domain ports with significant channel characteristics of the uplink channel of the second UE in the angle domain may be directly used as indexes (1, 2 and 5) of angle domain ports with significant channel characteristics of the downlink channel of the second UE in the angle domain.

As shown in FIG. 14B, the indexes of antenna ports corresponding to the top 3 channel characteristics having larger amplitude values in the downlink channel of the second UE in the angle domain are also 1, 2 and 5 respectively. Thus, the indexes of angle domain ports corresponding to the top 3 channel characteristics having larger amplitude values in the downlink channel of the second UE in the angle domain calculated in the above manner are consistent with the indexes of angle domain ports corresponding to the top 3 actual channel characteristics having larger amplitude values in the downlink channel of the second UE in the angle domain.

Figure 15A:
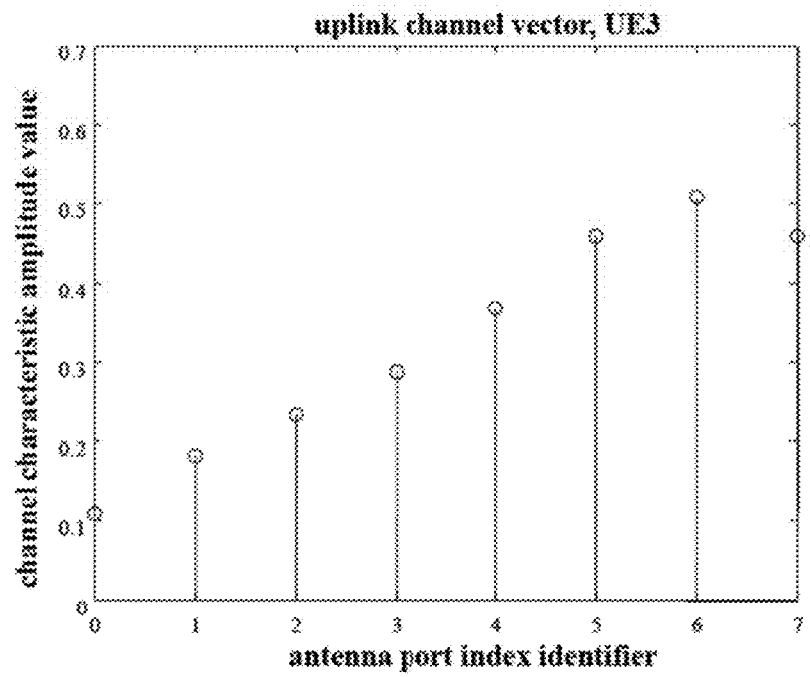
FIG. 15A is a diagram illustrating a channel state of an uplink channel of a third UE according to an embodiment of the present disclosure.
Figure 15B:
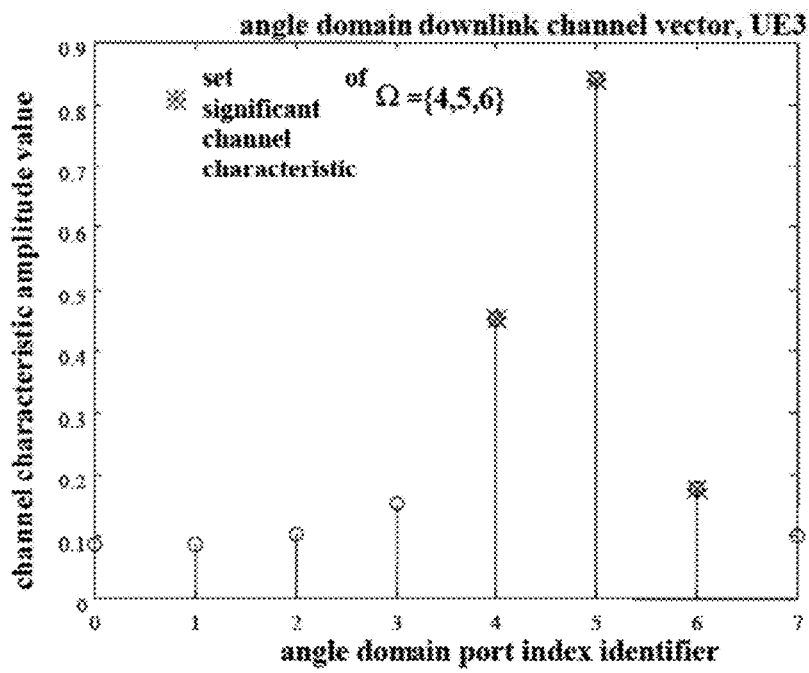
FIG. 15B is a diagram illustrating actual channel characteristics of a downlink channel of a third UE in the angle domain according to an embodiment of the present disclosure.

FIG. 15A is a diagram illustrating a channel state of an uplink channel of a third UE according to an embodiment of the present disclosure. FIG. 15B is a diagram illustrating actual channel characteristics of the downlink channel of the third UE in the angle domain according to an embodiment of the present disclosure. Similar to FIG. 13A, it can be determined that the indexes of angle domain ports corresponding to the top 3 channel characteristics having larger amplitude values in the uplink channel of the third UE in the angle domain are 4, 5 and 6 respectively.

In addition, as it is assumed that the antennas provided for the BS are antennas in a uniform linear array as described above, it can be determined according to the following predetermined correction condition whether the indexes (4, 5 and 6) of the three angle domain ports with significant channel characteristics of the uplink channel of the third UE in the angle domain need to be corrected:

$$\Delta f \times M > f_1$$

As described above, since $\Delta f \times M = (f_1 - f_2) \times M = (f_1 - 0.9 f_1) \times 8 = 0.8 f_1 < f_1$, there is no need to correct the indexes (4, 5 and 6) of the three angle domain ports with significant channel characteristics of the uplink channel of the third UE in the angle domain. That is, the indexes (4, 5 and 6) of the three angle domain ports with significant channel characteristics of the uplink channel of the third UE in the angle domain can be directly determined as the indexes (4, 5 and 6) of the three angle domain ports with significant channel characteristics of the downlink channel of the third UE in the angle domain.

Further, similarly, in a scenario where there is no requirement for high accuracy of the system, instead of determining whether correction needs to be performed according to the above predetermined correction condition, the indexes (4, 5 and 6) of the angle domain ports with significant channel characteristics of the uplink channel of the third UE in the angle domain may be directly used as the indexes (4, 5 and 6) of the angle domain ports with significant channel characteristics of the downlink channel of the third UE in the angle domain.

As shown in FIG. 15B, indexes of angle domain ports corresponding to the top 3 channel characteristics having larger amplitude values in the downlink channel of the third UE in the angle domain are also 4, 5 and 6 respectively. Thus, the indexes of the angle domain ports corresponding to the top 3 channel characteristics having larger amplitude values in the downlink channel of the third UE in the angle domain calculated in the above manner are consistent with the indexes of the angle domain ports corresponding to the top 3 actual channel characteristics having larger amplitude values in the downlink channel of the third UE in the angle domain.

Referring back to FIG. 8, in step 8004, a first set of pilot signals used in the angle domain is determined based on the determined channel characteristics of the first channel (e.g., the downlink channel) in the angle domain, wherein the pilot signals in the first set of pilot signals are orthogonal to each other.

According to the MIMO channel model provided by the 3GPP standardization organization (see 3GPP TR 36.814 V9.0.0, "Further advancements for E-UTRA physical layer aspects", March 2010), in the Urban Macro-cell scenario, since the height of the macro base station is often high and the scatterers are often distributed around the user, channel angle spreading is small, resulting in sparsity of the channels in the angle domain.

Therefore, when designing pilot signals in the angle domain, the sparse characteristics of the channels in the angle domain can be utilized to only place orthogonal pilot signals in positions in the angle domain where the channel characteristics are significant, and set zero to other positions than that having significant channel characteristics in the angle domain, so that the overhead of pilot signal can be reduced, and in turn the overhead of channel estimation can be reduced.

For example, suppose there is only one UE (a first user equipment) in a wireless communication system. Returning back to FIGS. 13A and 13B, since it has been determined that the indexes of the three angle domain ports with significant channel characteristics of the uplink channel of the first UE in the angle domain are 2, 3, and 4, orthogonal pilot signals can be placed at these three angle domain ports (2, 3 and 4) with significant channel characteristics in the angle domain, and other angle domain ports (0, 1, 5, 6 and 7) in the angle domain are set to zero. Therefore, the overhead of pilot signal can be reduced, and in turn the overhead of channel estimation can be reduced.

According to an embodiment of the present disclosure, in a case where a first communication apparatus (e.g., a BS) communicates with multiple second communication apparatus (e.g., multiple UEs), a first set of pilot signals used in the angle domain can be determined for the multiple second communication apparatus (e.g., multiple UEs), wherein respective pilot signals in the first set of pilot signals are orthogonal to each other with respect to angles as a union of N angles with significant channel characteristics in the angle domain of a corresponding first channel (e.g., the downlink channel) from the first communication apparatus (e.g., a BS) to each (e.g., each UE) of the multiple second communication apparatus (e.g., multiple UEs), wherein N is a natural number greater than or equal to 1.

Below an example of an angle domain completely orthogonal pilot signal sequence according to an embodiment of the present disclosure is described with reference to FIG. 16, which is a schematic diagram illustrating an example of an angle domain completely orthogonal pilot signal sequence according to an embodiment of the present disclosure.

Assume that $\Omega_k^{DL}$ is a set of indexes of angle domain ports having significant channel characteristics of the downlink channel of the k-th UE in the angle domain, $\Omega = \cup_{k=0}^{K-1} \Omega_k^{DL}$ is a union of the set of indexes of angle domain ports having significant channel characteristics of the downlink channel of all the UEs in the angle domain.

In order to obtain an angle domain completely orthogonal pilot signal sequence, orthogonal pilot signals must be allocated for all angle domain ports whose indexes are included in the set $\Omega$, and the other angle domain ports do not send pilot signals. The angle domain completely orthogonal pilot signal sequence can ensure that angle domain channel estimations cannot interfere with each other in the case where the antenna angles of arrival of different UEs, that is, the set of indexes of the angle domain ports having significant channel characteristics of the downlink channel of different UEs in the angle domain, are different.

Assume that Nc is the number of orthogonal pilot signals required in the angle domain completely orthogonal pilot signal sequence (ie, the first set of pilot signals), that is, the overhead of downlink channel estimation. Due to the distribution randomness of the set of indexes of angle domain ports having significant channel characteristics of the downlink channel of each UE in the angle domain, there is Nc=min{KN,M}, where K is the number of UEs, N is the size of the set of angle domain ports having significant channel characteristics of the downlink channel of the UE in the angle domain, where M is the number of antennas provided for the BS, and min( ) is a function returning a minimum value of its parameters, K, N, and M all are natural numbers greater than or equal to 1. In other words, when the number of orthogonal pilot signals is Nc, the number of UEs that can be supported in the communication system at most is $$K = \left\lfloor \frac{N_c}{N} \right\rfloor,$$

where $\lfloor \cdot \rfloor$ denotes the rounding-down function.

Figure 16:
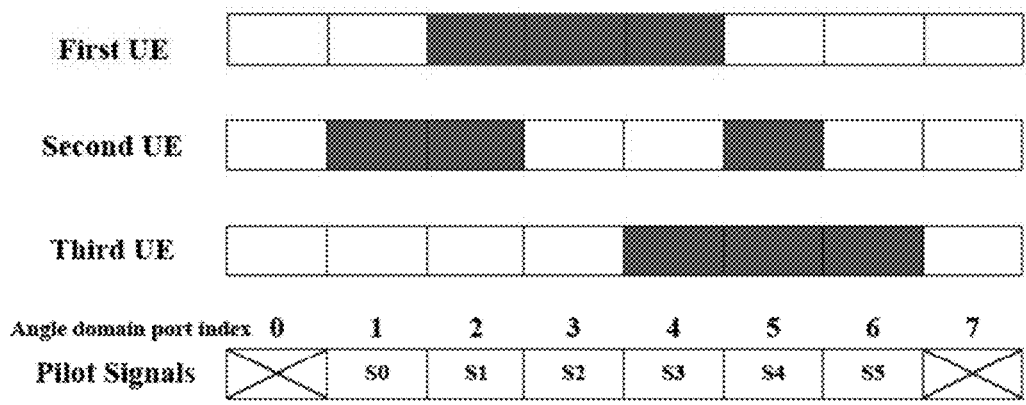
FIG. 16 is a diagram illustrating an example of an angle domain completely orthogonal pilot signal sequence according to an embodiment of the present disclosure.

As shown by the dark blocks in FIG. 16, it is assumed that the set $\Omega_0^{DL}$ of indexes of angle domain ports having significant channel characteristics of the downlink channel of the first UE in the angle domain is (2, 3 and 4), the set $\Omega_1^{DL}$ of indexes of angle domain ports having significant channel characteristics of the downlink channel of the second UE in the angle domain is (1, 2 and 5), and the set $\Omega_2^{DL}$ of indexes of angle domain ports having significant channel characteristics of the downlink channel of the third UE in the angle domain is (4, 5 and 6). Therefore, a union of the sets of indexes of angle domain ports having significant channel characteristics of the downlink channel of all the UEs in the angle domain is $\Omega=\cup_{k=0}^{2}\Omega_k^{DL}=(1, 2, 3, 4, 5, 6)$.

Thus, a completely orthogonal pilot signal sequence (S0, S1, S2, S3, S4, S5) can be allocated for the angle domain ports 1 to 6, and the other angle domain ports 0 and 7 are not used to send pilot signals, so that the angle domain completely orthogonal pilot signal sequence (i.e., the first set of pilot signals) is (0, S0, S1, S2, S3, S4, S5, 0).

Figure 18:
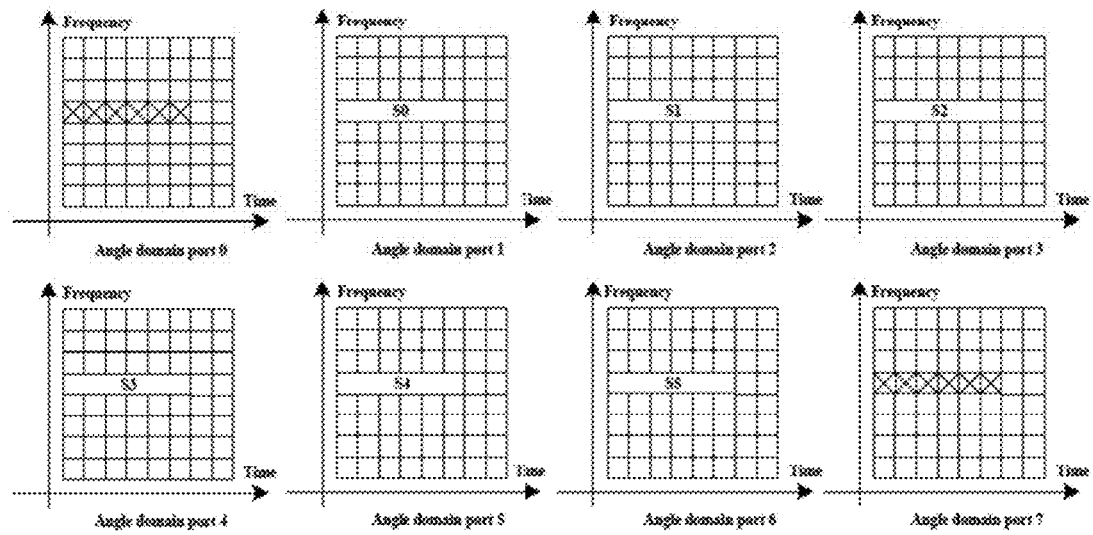
FIG. 18 is a schematic diagram illustrating an example of allocating transmission resources for angle domain completely orthogonal pilot signals according to an embodiment of the present disclosure.

An example of allocating transmission resources for angle domain completely orthogonal pilot signals according to an embodiment of the present disclosure will be described below with reference to FIG. 18. FIG. 18 is a schematic diagram illustrating an example of allocating transmission resources for angle domain completely orthogonal pilot signals according to an embodiment of the present disclosure.

According to the embodiment of the present disclosure, transmission resources are allocated for the pilot signals in the determined first set of pilot signals, and the number of transmission resources is proportional to the number of pilot signals in the determined first set of pilot signals.

As shown in FIG. 18, no pilot signals are sent on the angle domain ports 0 and 7, and an orthogonal pilot signal S0=[1, 0, 0, 0, 0, 0] is transmitted on the angle domain port 1, an orthogonal pilot signal S1=[0, 1, 0, 0, 0, 0] is transmitted on the angle domain port 2, an orthogonal pilot signal S2=[, 0, 1, 0, 0, 0] is transmitted on the angle domain port 3, an orthogonal pilot signal S3=[0, 0, 0, 1, 0, 0] is transmitted on the angle domain port 4, an orthogonal pilot signal S4=[0, 0, 0, 0, 1, 0] is transmitted on the angle domain port 5, and an orthogonal pilot signal S5=[0, 0, 0, 0, 0, 1] is transmitted on the angle domain port 6. Therefore, since the number of pilot signals S0 to S5 in the first set of pilot signals is 6, the number of required transmission resources is 6.

According to another embodiment of the present disclosure, in a case where a first communication apparatus (e.g., a BS) communicates with multiple second communication apparatus (e.g., multiple UEs), a first set of pilot signals used in the angle domain can be determined for the multiple second communication apparatus (e.g., multiple UEs). In the case where the number of pilot signals in the first set of pilot signals is minimum, respective pilot signal in the first set of pilot signals are orthogonal to each other with respect to angles corresponding to N angles having significant channel characteristics in the angle domain of a corresponding first channel (e.g., the downlink channel) from the first communication apparatus (e.g., a BS) to one of the multiple second communication apparatus (e.g., multiple UEs), where N is a natural number greater than or equal to 1.

Figure 17:
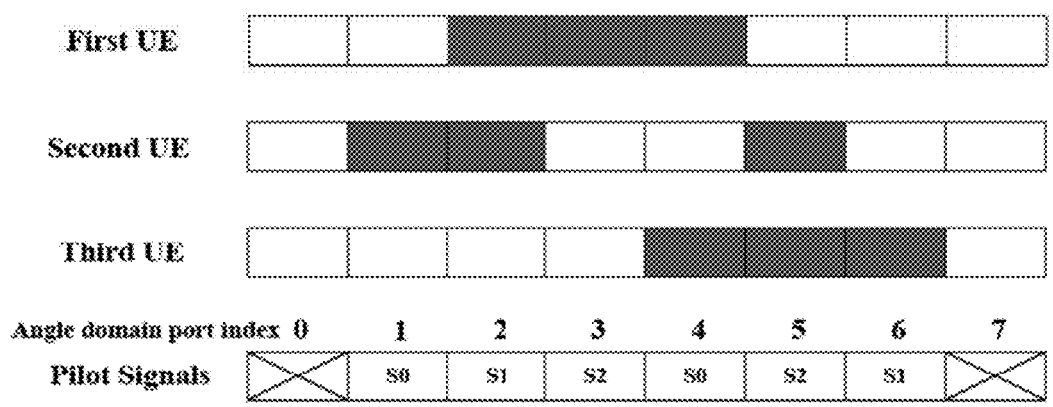
FIG. 17 is a diagram illustrating an example of an angle domain partially orthogonal pilot signal sequence according to an embodiment of the present disclosure.

An example of an angle domain partially orthogonal pilot signal sequence according to an embodiment of the present disclosure will be described below with reference to FIG. 17. FIG. 17 is a diagram illustrating an example of an angle domain partially orthogonal pilot signal sequence according to an embodiment of the present disclosure.

In order to obtain an angle domain partially orthogonal pilot signal sequence, for the k-th (1≤k≤K) UE, K is a natural number greater than or equal to 1, orthogonal pilot signals must be allocated for all angle domain ports whose indexes are in $\Omega_k^{DL}$, and other angle domain ports do not need to send pilot signals. The angle domain partially orthogonal pilot signal sequence may introduce some interference, but the interference is limited to interference from channel coefficients excluded from the set of indexes of angle domain ports having significant channel characteristics of the downlink channel of the UE in the angle domain to channel coefficients in the set of indexes. Due to channel sparsity in the angle domain, the channel coefficients excluded from the set of indexes have smaller amplitude values, so that the interference is small. Compared to the angle domain completely orthogonal pilot signal sequence, the angle domain partial orthogonal pilot signal sequence greatly reduces the number of required pilot signals.

Assume that Ns is the number of orthogonal pilot signals required in the angle domain partially orthogonal pilot signal sequence (ie, the first set of pilot signals), that is, the overhead of downlink channel estimation. The applicant has found by simulation experiments that Ns=1.5N is a relatively reasonable choice, where N is the size of the set of indexes of angle domain ports having significant channel characteristics of the downlink channel of the UE in the angle domain, and N is a natural number greater than or equal to 1.

As shown by the dark blocks in FIG. 17, it is assumed that the set of indexes $\Omega_0^{DL}$ of angle domain ports having significant channel characteristics of the downlink channel of the first UE in the angle domain is (2, 3 and 4), the set of indexes $\Omega_1^{DL}$ of angle domain ports having significant channel characteristics of the downlink channel of the second UE in the angle domain is (1, 2 and 5), and the set of indexes $\Omega_2^{DL}$ of angle domain ports having significant channel characteristics of the downlink channel of the third UE in the angle domain is (4, 5 and 6).

A partially orthogonal pilot signal sequence (S0,S1,S2, S0,S2,S1) can be allocated for the angle domain ports 1 to 6, and the other angle domain ports 0 and 7 do not send pilot signals, so that the obtained angle domain partially orthogonal pilot signal sequence (i.e., the first set of pilot signals) is (0,S0,S1,S2,S0,S2,S1,0). That is, for the first UE, orthogonal pilot signals S1, S2, and S0 are allocated for the angle domain ports 2, 3, and 4 in the set of indexes $\Omega_0^{DL}$; for the second UE, orthogonal pilot signals S0, S1, and S2 are allocated for the angle domain ports 1, 2, and 5 in the set of indexes $\Omega_1^{DL}$; and for the third UE, orthogonal pilot signals S0, S2, and S1 are allocated for the angle domain ports 4, 5, and 6 in the set of indexes L.

Figure 19:
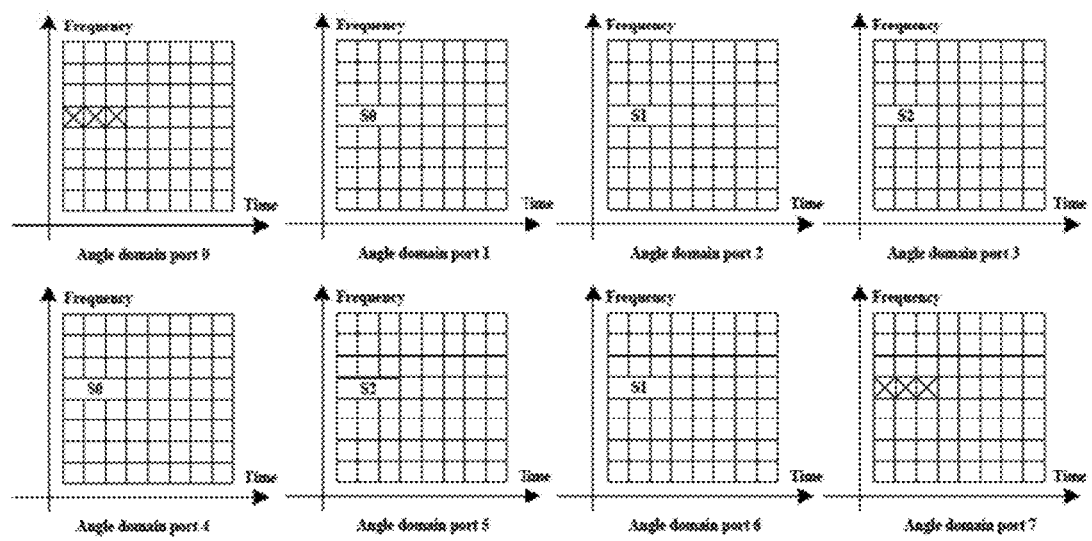
FIG. 19 is a schematic diagram illustrating an example of allocating transmission resources for angle domain partially orthogonal pilot signals according to an embodiment of the present disclosure.

An example of allocating transmission resources for angle domain partially orthogonal pilot signals according to an embodiment of the present disclosure will be described below with reference to FIG. 19. FIG. 19 is a schematic diagram illustrating an example of allocating transmission resources for angle domain partially orthogonal pilot signals according to an embodiment of the present disclosure.

According to the embodiment of the present disclosure, transmission resources are allocated for pilot signals in the determined first set of pilot signals, and the number of transmission resources is proportional to the number of pilot signals in the determined first set of pilot signals.

As shown in FIG. 19, no pilot signals are sent on the angle domain ports 0 and 7, and an orthogonal pilot signal S0=[1, 0, 0] is transmitted on the angle domain port 1, an orthogonal pilot signal S1=[0, 1, 0] is transmitted on the angle domain port 2, an orthogonal pilot signal S2=[0, 0, 1] is transmitted on the angle domain port 3, an orthogonal pilot signal S0=[1, 0, 0] is transmitted on the angle domain port 4, an orthogonal pilot signal S2=[0, 0, 0,] is transmitted on the angle domain port 5, and an orthogonal pilot signal S1=[0, 1, 0] is transmitted on the angle domain port 6. Therefore, since the number of pilot signals S0 to S2 in the first set of pilot signals is 3, the number of required transmission resources is 3.

Referring back to FIG. 8, in step 8005, the first set of pilot signals used in the angle domain is transformed into a second set of pilot signals (e.g., downlink pilot signals in the antenna domain or wireless physical channel) for transmission over the multiple antennas of the first communications device (e.g., a BS).

Once the first set of pilot signals used in the angle domain is obtained, it can be transformed to obtain a second set of pilot signals (e.g., downlink pilot signals in the antenna domain or wireless physical channel) for transmission over the multiple antennas of the first communications device (e.g., a BS).

In the above described embodiment of the present disclosure, the transformation performed on the first set of pilot signals used in the angle domain may be based on a Fourier transformation. More specifically, the transformation described above may be Fast Fourier Transform (FFT), and a transformation matrix adopted by FFT is determined according to the type of the multiple antennas of the first communication apparatus (e.g., a BS).

According to an embodiment of the present disclosure, if multiple antennas of the first communication apparatus (e.g., a BS) are antennas in a uniform linear array, the transformation matrix adopted by FFT is an M×M discrete fast Fourier transformation matrix, where M is the number of antennas of the first communication apparatus (e.g., a BS), and M is a natural number greater than or equal to 1.

For example, the element in the p-th row and the q-th column in the above M×M discrete fast Fourier transformation matrix F can be expressed as:

$$[F]_{p,q} = \frac{1}{\sqrt{M}} \times e^{-j2\pi \frac{(p-1)(q-1)}{M}}$$

According to an embodiment of the present disclosure, if the multiple antennas of the first communication apparatus (e.g., a BS) are antennas in a uniform planar array, the transformation matrix adopted by FFT is $F_W \otimes F_H$, where $F_W$ is a W×W discrete fast Fourier transformation matrix, and $F_H$ is a H×H discrete fast Fourier transformation matrix, $\otimes$ denotes the Kronecker product, W and H represent the numbers of antennas of the first communication apparatus (e.g., a BS) in the horizontal and vertical directions respectively, which satisfy W×H=M, in which M is the number of antennas of the first communication apparatus (e.g., a BS), and M, W, and H all are natural numbers greater than or equal to 1.

For example, the element in the p-th row and q-th column in the W×W discrete fast Fourier transformation matrix $F_W$ may be:

$$[F_W]_{p,q} = \frac{1}{\sqrt{W}} \times e^{-j2\pi \frac{(p-1)(q-1)}{W}}$$

Similarly, for example, the element of in the p-th and q-th columns in the H×H discrete fast Fourier transformation matrix $F_H$ may be:

$$[F_H]_{p,q} = \frac{1}{\sqrt{H}} \times e^{-j2\pi \frac{(p-1)(q-1)}{H}}$$

An example of performing FFT on the first set of pilot signals used in the angle domain will be described in detail below.

Taking a FFT transformation of length 4 as an example, the FFT matrix may be, for example, $$\begin{bmatrix} 0.5 & 0.5 & 0.5 & 0.5 \\ 0.5 & -0.5i & -0.5 & 0.5i \\ 0.5 & -0.5 & 0.5 & -0.5 \\ 0.5 & 0.5i & -0.5 & -0.5i \end{bmatrix}$$

If the angle domain ports 1 and 2 transmit pilot signal 1 at the same time and other angle domain ports 0 and 3 do not transmit pilot signals, then the pilot signal after FFT transformation transmitted on the antenna ports is:

$$\begin{bmatrix} 0.5 & 0.5 & 0.5 & 0.5 \\ 0.5 & -0.5i & -0.5 & 0.5i \\ 0.5 & -0.5 & 0.5 & -0.5 \\ 0.5 & 0.5i & -0.5 & -0.5i \end{bmatrix} \times$$

$$\begin{bmatrix} 0 \\ 1 \\ 1 \\ 0 \end{bmatrix} = \begin{bmatrix} 0.5 \\ -0.5i \\ -0.5 \\ 0.5i \end{bmatrix} + \begin{bmatrix} 0.5 \\ -0.5 \\ 0.5 \\ -0.5 \end{bmatrix} = \begin{bmatrix} 1 \\ -0.5 - 0.5i \\ 0 \\ -0.5 + 0.5i \end{bmatrix}$$

It can be seen that the pilot signal after FFT transformation transmitted on the antenna ports is equal to the second column of the FFT matrix multiplied by 1, plus its third column multiplied by 1.

Similarly, referring back to FIG. 17, another example of performing FFT on a first set of pilot signals used in the angle domain will be described with the first set of angle domain partially orthogonal pilot signals (0,S0,S1,S2,S0,S2, S1,0) shown in FIG. 17 as an example.

Specifically, it is assumed that the angle domain partially orthogonal pilot signals are: S0=[1,0,0], S1=0,1,0 and S2= [0,0,1] respectively.

For all the angle domain ports 0 to 7, the downlink pilot signal in the angle domain is $$\Phi = \begin{bmatrix} 0 \\ S0 \\ S1 \\ S2 \\ S0 \\ S2 \\ S1 \\ 0 \end{bmatrix} = \begin{bmatrix} 0 & 0 & 0 \\ 1 & 0 & 0 \\ 0 & 1 & 0 \\ 0 & 0 & 1 \\ 1 & 0 & 0 \\ 0 & 0 & 1 \\ 0 & 1 & 0 \\ 0 & 0 & 0 \end{bmatrix}$$

That is, in the first time slice (the first column in the above matrix $\Phi$), a bit 1 is transmitted on the angle domain ports 1 and 4, and no pilot signal is transmitted on the other ports 0, 2-3, and 5-7; in the second time slice (the second column in the above matrix $\Phi$), a bit 1 is transmitted on the angle domain ports 2 and 6, and no pilot signal is transmitted on the other ports 0-1, 3-5 and 7; in the third time slice (the third column in the above matrix $\Phi$), a bit 1 is transmitted on the angle domain ports 3 and 5, and no pilot signal is transmitted on the other ports 0-2, 4 and 6-7.

Thus, in the first time slice, the signal sent on the antennas is the sum of the second row of the FFT matrix multiplied by 1 and the fifth row of the FFT matrix multiplied by 1; in the second time slice, the signal sent on the antennas is the sum of the third row of the FFT matrix multiplied by 1 and the seventh row of the FFT matrix multiplied by 1; in the third time slice, the signal sent on the antennas is the sum of the fourth row of the FFT matrix multiplied by 1 and the sixth row of the FFT matrix multiplied by 1.

Referring back to FIG. 8, in step 8006, the second set of pilot signals (for example, downlink pilot signals in the antenna domain or wireless physical channel) is sent to the second communication apparatus (e.g., a UE) over the multiple antennas of the first communications device (e.g., a BS).

In step 8007, channel estimation is performed on the first channel (for example, the downlink channel) from the first communication apparatus (e.g., a BS) to the second communication apparatus (e.g., a UE) based on the second set of pilot signals (for example, downlink pilot signals in the antenna domain or wireless physical channel) from the multiple antennas of the first communications device (e.g., a BS).

Considering a single-cell large-scale antenna system operating in the FDD mode. The BS is equipped with M antennas and serves K single-antenna users. M and K both are natural numbers greater than or equal to 1. The downlink channel estimation model can be expressed as:

$$y = h^{DL,T}\Phi + n$$

where, $\Phi$ represents pilot signals transmitted on the antenna ports (associated with a wireless physical channel), and the jth (1≤j≤M) row of $\Phi$ represents the pilot signal transmitted on the jth antenna.

In addition, the channel $\tilde{h}$ in the angle domain can be defined as a FFT transformation of a wireless physical channel h, i.e., $\tilde{h}=Fh$. Similarly, the pilot signal $\tilde{\Phi}$ in the angle domain can be defined as an iFFT transformation of the pilot signal $\Phi$ transmitted on the wireless physical channel, i.e., $\tilde{\Phi}=F^H\Phi$. Thereby, a downlink channel estimation model in the angle domain can be obtained:

$$y = (F^H h^{DL})^T (F\tilde{\Phi}) + n = \tilde{h}^{DL,T}\tilde{\Phi} + n$$

Therefore, the channel $\tilde{h}$ in the angle domain can be estimated from the pilot signal $\tilde{\Phi}$ in the angle domain, and the wireless physical channel h or the antenna domain channel h can be reconstructed by an iFFT (inverse FFT) transformation.

According to the downlink channel estimation model in the angle domain described above, the UE may estimate channel coefficients in the angle domain corresponding to each orthogonal pilot signal using a channel estimation method, such as LS, MMSE, etc.

In step 8008, based on a result of the channel estimation performed on the first channel (for example, the downlink channel) from the first communication apparatus (e.g., a BS) to the second communication apparatus (e.g., a UE), channel characteristics of the first channel at multiple angles corresponding to the pilot signals in the first set of pilot signals, which will be fed back to the first communication apparatus (e.g., a BS) are determined for channel reconstruction of the first channel (for example, the downlink channel).

According to an embodiment of the present disclosure, channel characteristics of the first channel (for example, the downlink channel) at multiple angles corresponding to the respective pilot signals in the first set of pilot signals may be fed back to the first communication apparatus (e.g., a BS) in a predetermined order sequentially. According to this embodiment, the first communication apparatus can obtain abundant results of channel estimation and reconstruct a more accurate physical channel.

For example, taking the angle domain completely orthogonal pilot signal sequence shown in FIG. 16 as an example, the UE sequentially feeds back channel coefficients corresponding to the orthogonal pilot signals S0, S1, S2, S3, S4, and S5 (that is, indexes 1~6 of angle domain ports).

As another example, taking the angle domain partially orthogonal pilot signal sequence shown in FIG. 17 as an example, the UE sequentially feeds back channel coefficients corresponding to the orthogonal pilot signals S0, S1, S2. As described above, the BS can be aware of some angles having significant channel characteristics corresponding to the UE from uplink channel estimation. In combination with such information, a physical channel can be reconstructed according to the channel coefficients sequentially fed back by the UE.

According to an embodiment of the present disclosure, significant channel characteristics in channel characteristics of the first channel (for example, the downlink channel) at multiple angles and indexes identifiers of pilot signals in the first set of pilot signals corresponding to the significant channel characteristics can be fed back to the first communication apparatus (e.g., a BS). In this embodiment, the feedback overhead of the second communication apparatus is reduced.

For example, taking the angle domain completely orthogonal pilot signal sequence shown in FIG. 16 as an example, the first UE estimates that among the obtained channel coefficients, the channel coefficients corresponding to the orthogonal pilot signals S1, S2 and S3 have the largest amplitude values, the first UE may only feed back the channel coefficients corresponding to the orthogonal pilot signals S1, S2 and S3 and the index identifiers of these orthogonal pilot signals S1, S2 and S3.

As another example, taking the angle domain partially orthogonal pilot signal sequence shown in FIG. 17 as an example, assume that the first UE estimates that, among the obtained channel coefficients, the channel coefficient corresponding to the orthogonal pilot signal S1 has the largest amplitude value, the first UE may feed back the channel coefficient corresponding to the orthogonal pilot signal S1 and feed back the index identifier of the orthogonal pilot signal S1. As described above, the BS can be aware of some angles having significant channel characteristics corresponding to a UE from uplink channel estimation. In combination with such information, a physical channel can be reconstructed based on the most significant channel coefficient fed back by the UE in sequence.

In step 8009, the first channel (for example, the downlink channel) is reconstructed based on the channel characteristics of the first channel (for example, the downlink channel) at multiple angles, which are fed back from the second communication apparatus (e.g., a UE) and correspond to the pilot signals in the first set of pilot signals.

According to the downlink channel estimation model in the angle domain described above $y=(F^H\tilde{h}^{DL})^T(F\tilde{\Phi})+n=\tilde{h}^{DL,T}\tilde{\Phi}+n$, a channel $\tilde{h}$ in the angle domain can be estimated from the pilot signal $\tilde{\Phi}$ in the angle domain, and a wireless physical channel h can be reconstructed through an iFFT transformation.

Specifically, after the feedback step, the BS obtains channel coefficients fed back by each UE and orthogonal pilot signals corresponding to the channel coefficients. Because the orthogonal pilot signals are allocated based on a set of indexes of angle domain ports having significant channel characteristics of the downlink channel of each UE in the angle domain, for each UE, the BS can obtain the indexes of angle domain ports corresponding to each feedback channel coefficient. When the downlink channel of each UE is reconstructed, the value of each angle domain port is set to a corresponding feedback channel coefficient, or zero if no corresponding feedback channel coefficient is available, to obtain a reconstructed channel in the angle domain.

Finally, iFFT is performed on a vector of the reconstructed channel in the angle domain to obtain a reconstructed downlink channel of the UE.

4. CONFIGURATION OF THE ANGLE DOMAIN ORTHOGONAL PILOT SYSTEM ACCORDING TO AN EMBODIMENT OF THE PRESENT DISCLOSURE

Figure 11:
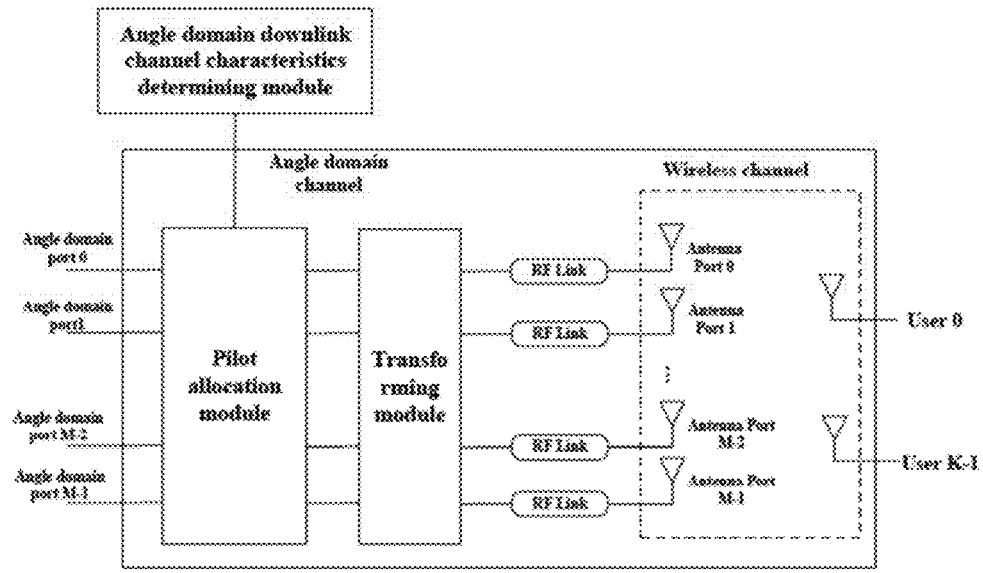
FIG. 11 is a diagram showing an example of the configuration of an angle domain orthogonal pilot system according to an embodiment of the present disclosure.

An example of the configuration of the angle domain orthogonal pilot system according to an embodiment of the present disclosure will be described below with reference to FIG. 11. FIG. 11 is a diagram showing an example of the configuration of the angle domain orthogonal pilot system according to an embodiment of the present disclosure.

As shown in FIG. 11, an angle domain downlink channel characteristic determining module may be configured to estimate a set of indexes of angle domain ports having significant channel characteristics of the downlink channel of each UE in the angle domain; a pilot allocation module may be configured to allocate orthogonal pilot signals for each angle domain port according to the set of indexes of angle domain ports having significant channel characteristics of the downlink channel of each UE in the angle domain, which are then sent to each UE via corresponding RF links and antenna ports after FFT transformation. It should be noted that the angle domain channel shown in FIG. 11 represents an equivalent channel between the angle domain ports and various UEs.

In addition, the RF links shown in FIG. 11 correspond to the antenna ports one by one, but the present disclosure is not limited to this example. For example, the present disclosure can also be applied to an example in which one RF link connects a plurality of antennas, and in this case, a plurality of antennas connected by the same RF link can be regarded as one antenna in the example of the present disclosure.

5. EXEMPLARY FLOW OF A COMMUNICATION METHOD ACCORDING TO AN EMBODIMENT OF THE PRESENT DISCLOSURE

An example of the flow of a communication method according to an embodiment of the present disclosure will be described below with reference to FIGS. 20 and 21.

Figure 20:
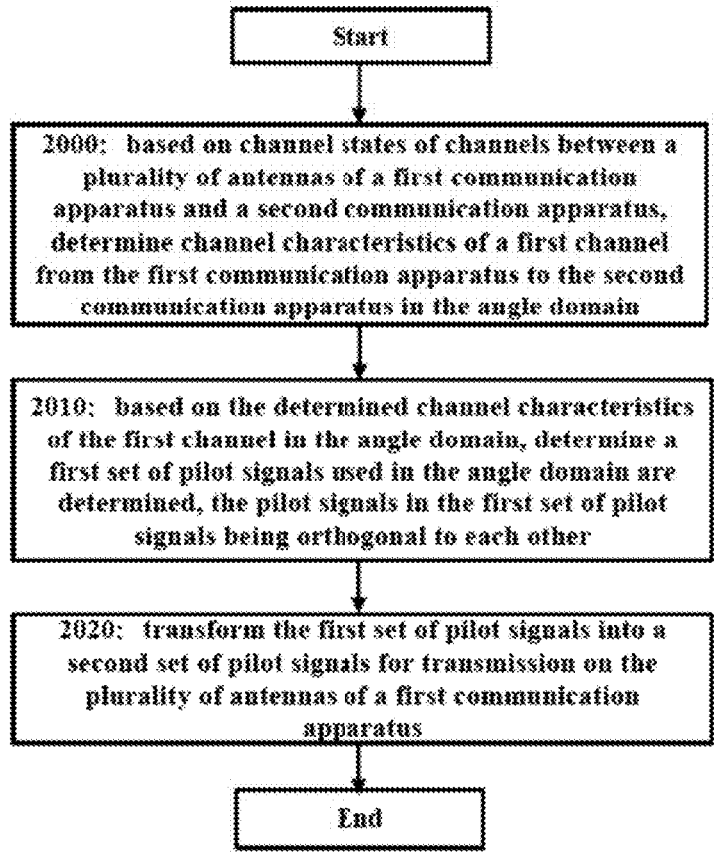
FIG. 20 is a flowchart illustrating a communication method for a first communication apparatus having multiple antennas according to an embodiment of the present disclosure.

FIG. 20 is a flowchart illustrating a communication method for a first communication apparatus having multiple antennas according to an embodiment of the present disclosure.

As shown in FIG. 20, in step 2000, based on channel states of channels between the multiple antennas of the first communication apparatus and a second communication apparatus, channel characteristics of a first channel from the first communication apparatus to the second communication apparatus in the angle domain are determined.

In step 2010, based on the determined channel characteristics of the first channel in the angle domain, a first set of pilot signals are determined for being used in the angle domain, the pilot signals in the first set of pilot signals being orthogonal to each other.

In step 2020, the first set of pilot signals are transformed into a second set of pilot signals for transmission over the multiple antennas of the first communication apparatus.

It should be noted that the communication method for a first communication apparatus having multiple antennas according to an embodiment of the present disclosure shown in FIG. 20 may be performed by the electronic device for the first communication apparatus having multiple antennas shown in FIG. 6, and it can refer to the above description for details, which will not be repeated herein.

Figure 21:
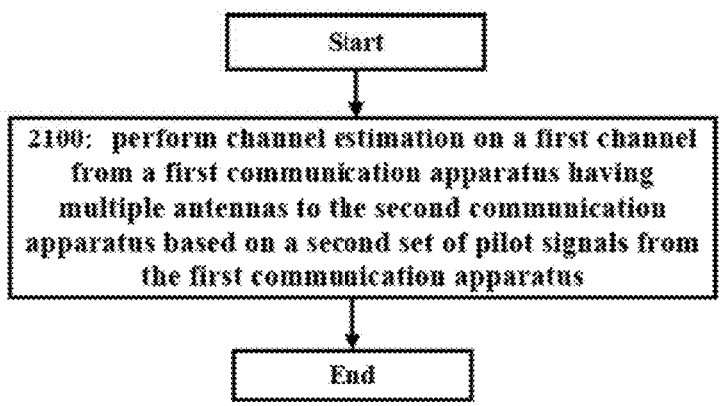
FIG. 21 is a flowchart illustrating a communication method for a second communication apparatus according to an embodiment of the present disclosure.

FIG. 21 is a flowchart illustrating a communication method for a second communication apparatus according to an embodiment of the present disclosure.

As shown in FIG. 21, in step 2100, channel estimation is performed on a first channel from a first communication apparatus having multiple antennas to the second communication apparatus based on a second set of pilot signals from the first communication apparatus, wherein the second set of pilot signals is determined by the first communication apparatus by the following process: based on channel states of channels between the multiple antennas of the first communication apparatus and the second communication apparatus, determining channel characteristics of a first channel from the first communication apparatus to the second communication apparatus in the angle domain; based on the determined channel characteristics of the first channel in the angle domain, determining a first set of pilot signals for being used in the angle domain, the pilot signals in the first set of pilot signals being orthogonal to each other; and transforming the first set of pilot signals into a second set of pilot signals for transmission over the multiple antennas of the first communication apparatus.

It should be noted that the communication method for the second communication apparatus according to an embodiment of the present disclosure shown in FIG. 21 may be performed by the electronic device for the second communication apparatus shown in FIG. 7, and it can refer to the above description for details, which will not be repeated herein.

6. OTHER EMBODIMENTS OF THE PRESENT DISCLOSURE

Other embodiments of the present disclosure will be described below with reference to FIGS. 9 and 12.

Figure 9:
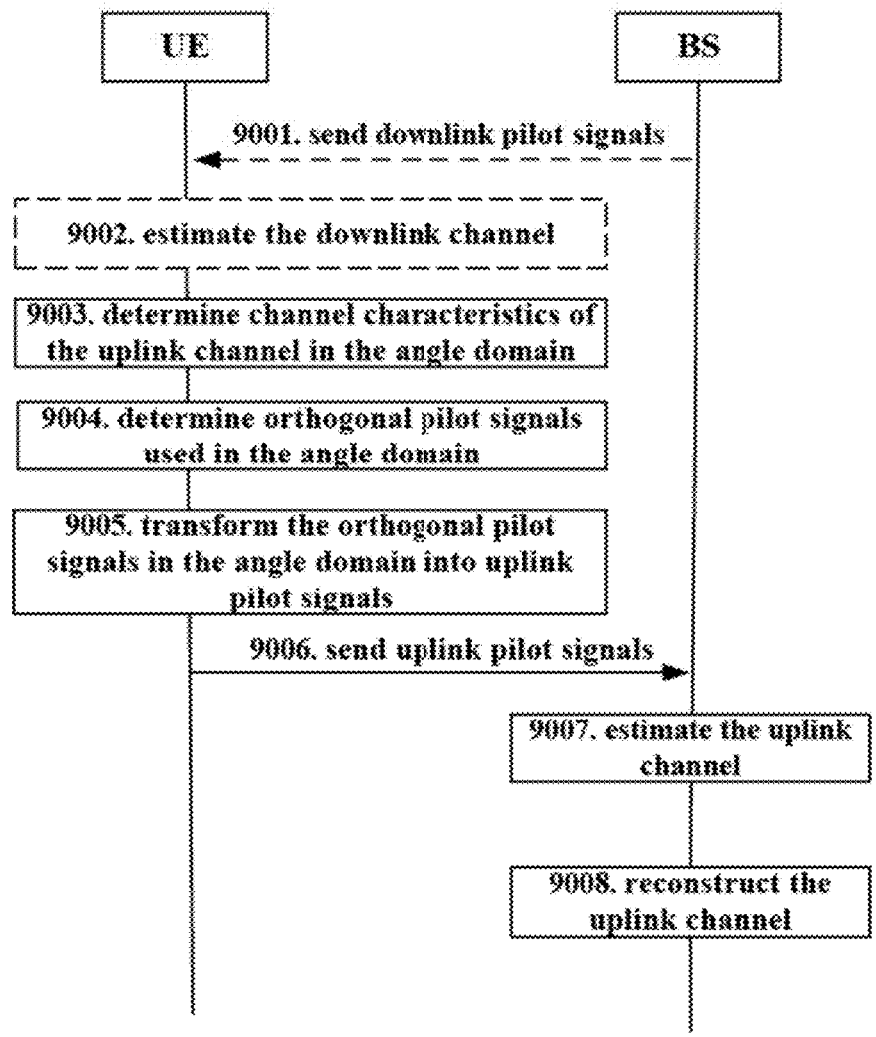
FIG. 9 is a flowchart illustrating an example of a signaling interaction procedure performed between a UE and a BS according to the embodiment of the present disclosure.

FIG. 9 is a flowchart illustrating an example of a signaling interaction procedure performed between a UE and a BS according to the embodiment of the present disclosure.

As shown in FIG. 9, steps 9001 and 9002 in FIG. 9 are optional steps.

In step 9001, downlink pilot signals may be transmitted from the BS to the UE.

In step 9002, a downlink channel may be estimated based on the downlink pilot signals transmitted from the BS to the UE to determine a channel state of the downlink channel.

In step 9003, based on channel states of channels between a plurality of antennas of the UE and the BS, channel characteristics of an uplink channel from the UE to the BS in the angle domain are determined.

In step 9004, a first set of pilot signals used in the angle domain is determined based on the determined channel characteristics of the uplink channel in the angle domain, the pilot signals in the first set of pilot signals being orthogonal to each other.

In step 9005, the first set of pilot signals used in the angle domain is transformed into a second set of pilot signals (e.g., uplink pilot signals in the antenna domain or wireless physical channel) for transmission over the multiple antennas of the UE.

In step 9006, the second set of pilot signals (for example, uplink pilot signals in the antenna domain or wireless physical channel) is sent to the BS over the multiple antennas of the UE.

In step 9007, channel estimation is performed on the uplink channel from the UE to the BS based on the second set of pilot signals (for example, uplink pilot signals in the antenna domain or wireless physical channel) from the UE having multiple antennas.

In step 9008, channel characteristics of the uplink channel at multiple angles corresponding to the pilot signals in the first set of pilot signals are determined based on a result of channel estimation performed on the uplink channel from the UE to the BS, and then the uplink channel is reconstructed.

It should be noted that the example of the signaling interaction procedure performed between the UE and the BS shown in FIG. 9 is similar to the example of the signaling interaction procedure performed between the BS and the UE shown in FIG. 8, and thus similar contents will not be described in detail herein.

Another example of the configuration of an angle domain orthogonal pilot system according to an embodiment of the present disclosure will be described below with reference to FIG. 12. FIG. 12 is a diagram showing another example of the configuration of an angle domain orthogonal pilot system according to an embodiment of the present disclosure.

Figure 12:
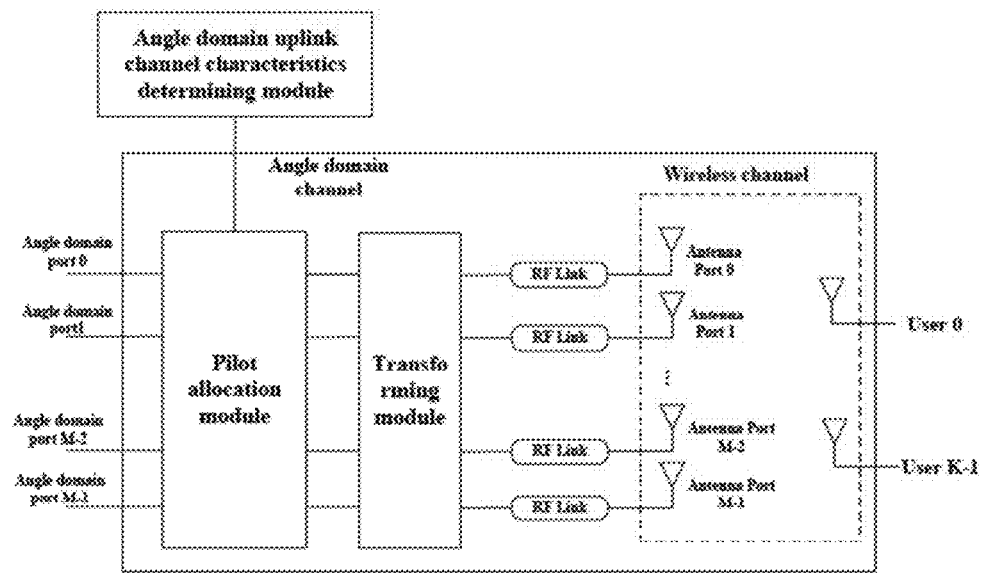
FIG. 12 is a diagram showing another example of the configuration of an angle domain orthogonal pilot system according to an embodiment of the present disclosure.

As shown in FIG. 12, an angle domain uplink channel characteristic determining module may be configured to estimate a set of indexes of angle domain ports for a BS which have significant channel characteristics of the uplink channel in the angle domain; a pilot allocation module may be configured to allocate orthogonal pilot signals for each angle domain port based on the set of indexes of angle domain ports which have significant channel characteristics of the uplink channel in the angle domain, and then the orthogonal pilot signals are sent to the BS via corresponding RF links and antenna ports after FFT transformation. It should be noted that the angle domain channel shown in FIG. 12 represents an equivalent channel between the angle domain ports and the BS.

In addition, the RF links shown in FIG. 12 correspond to the antenna ports one by one, but the present disclosure is not limited to this example. For example, the present disclosure can also be applied to an example in which one RF link connects to a plurality of antennas, and in this case, a plurality of antennas connected by the same RF link can be regarded as one antenna in the example of the present disclosure.

Still another embodiment of the present disclosure will be described below with reference to FIGS. 22 and 23.

Figure 22:
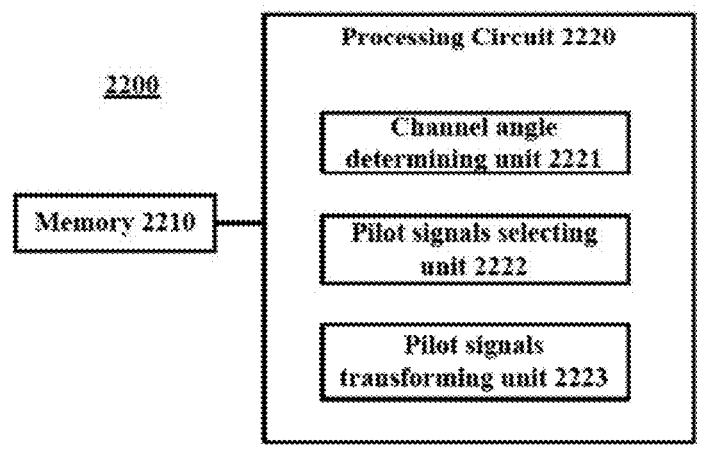
FIG. 22 is a block diagram illustrating the configuration of still another example of an electronic device according to an embodiment of the present disclosure.

FIG. 22 is a block diagram illustrating the configuration of still another example of an electronic device according to an embodiment of the present disclosure.

The electronic device 2200 for a multi-antenna communication system according to the embodiment of the present disclosure may include, for example, a processing circuit 2220 and a memory 2210.

The processing circuit 2220 of the electronic device 2200 used for a multi-antenna communication system is configured to provide various functions for the electronic device 2200 for the multi-antenna communication system. For example, in the embodiment of the present disclosure, the processing circuit 2220 of the electronic device 2200 for a multi-antenna communication system may include a channel angle determining unit 2221, a pilot signal selecting unit 2222, and a pilot signal transforming unit 2223. The channel angle determining unit 2221 may be configured to determine a channel angle between a communication terminal and a BS based on a state of an uplink channel from the communication terminal to the BS. The pilot signal selecting unit 2222 may be configured to select a part of a plurality of pilot signals for the channel angle, wherein the BS has multiple antennas, and the multiple pilot signals support channel angles covered by the multiple antennas of the BS. The pilot signal transforming unit 2223 may be configured to transform the part of pilot signals into signals for transmission over the multiple antennas of the BS.

In addition, according to an embodiment of the present disclosure, the pilot signal transforming unit 2223 in the processing circuit 2220 of the electronic device 2200 for the multi-antenna wireless communication system may be configured to transform the part of the pilot signals into signals for transmission over the multiple antennas of the BS based on a Fourier transform.

Figure 23:
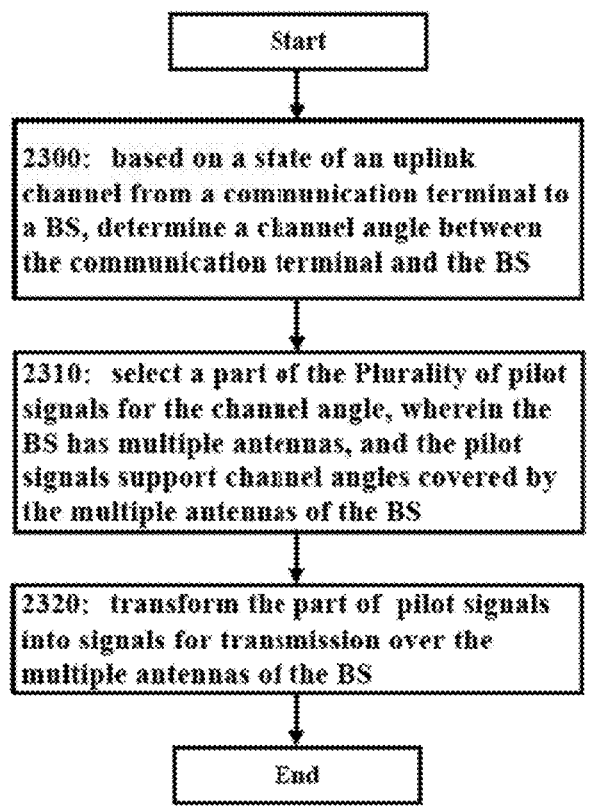
FIG. 23 is a flowchart illustrating a communication method for an electronic device according to an embodiment of the present disclosure.

FIG. 23 is a flowchart illustrating a communication method for an electronic device according to an embodiment of the present disclosure.

As shown in FIG. 23, in step 2300, based on a state of an uplink channel from a communication terminal to a BS, a channel angle between the communication terminal and the BS is determined.

In step 2310, a part of a plurality of pilot signals may be selected for the channel angle, wherein the BS has multiple antennas, and the plurality of pilot signals support channel angles covered by the multiple antennas of the BS.

In step 2320, the part of pilot signals may be transformed into signals for transmission over the multiple antennas of the BS.

It should be noted that the communication method for the electronic device according to an embodiment of the present disclosure shown in FIG. 23 may be performed by the electronic device shown in FIG. 22, it can refer to the above description for details, which will not be repeated herein.

7. EXAMPLE OF SIMULATION RESULT ACCORDING TO AN EMBODIMENT OF THE PRESENT DISCLOSURE

An example of throughput rate of a cell in a communication system according to an embodiment of the present disclosure will be described below with reference to FIGS. 24 and 25.

Consider a single-cell FDD large-scale antenna system, the BS is equipped with M antennas and serves K single-antenna UEs simultaneously. The type of antennas used by the BS is ULA or UPA. Specific simulation parameters are shown in the following table.

TABLE 1

| specific simulation parameters | |
| --- | --- |
| Pilot design scheme | Partially orthogonal pilot design |
| Precoding algorithm | Zero Forcing Algorithm (ZF) |
| the number M of antennas of BS | 64 |

TABLE 1-continued specific simulation parameters

| Pilot design scheme | Partially orthogonal pilot design |
|---|---|
| the number of users in the cell | 4 |
| antenna type | ULA/8x8UPA |
| channel parameters $\{N_{cl}, N_{ray}\}$ | $\{6, 20\}$ |
| Angle spread (horizontal direction) | 8 degree |
| Angle spread (vertical direction) | 5 degree |
| uplink channel wavelength $\lambda_{UL}$ | 2d |
| downlink channel wavelength $\lambda_{DL}$ | $\frac{10}{9}\lambda_{UL}$ |

First, as shown in Table 2, a comparison between the pilot overhead required in the traditional scheme and that required in the channel estimation in the angle domain of the present disclosure may be considered. Where, it is assumed that the size of a coherent resource block is $B_cT_c=200$ symbols, $B_c$ is the coherence bandwidth, and $T_c$ is the coherence time. For the partially orthogonal pilot scheme, three sets of different parameters are considered, which are: (1) N=4, Ns=6. (2) N=6, Ns=9. (3) N=12, Ns=18.

TABLE 2

Comparison of downlink channel resource overhead

| scheme | pilot overhead |
|---|---|
| traditional scheme, τ = 64 | 32% |
| The scheme of the present disclosure, N = 4, Ns = 6 | 3% |
| The scheme of the present disclosure, N = 6, Ns = 9 | 4.5% |
| The scheme of the present disclosure, N = 12, Ns = 18 | 9% |

It can be seen that the length of the pilot sequence in the conventional scheme is the number of the antennas of the BS, causing that the pilot overhead is very large. However, the angle domain channel estimation scheme using a partially orthogonal pilot signal sequence proposed in the present disclosure can greatly reduce the pilot overhead. For example, with N=4, Ns=6, the pilot overhead is only about 10% of the traditional scheme.

Further, considering the downlink throughput rate of the cell, if the pilot overhead is r, the downlink throughput rate of the cell is calculated according to the following equation:

$$C = (1-r)\sum_{k=1}^{K} \log_2(1 + SINR_k)$$

wherein, $SINR_k$ is the signal to noise ratio of the kth UE.

Figure 24:
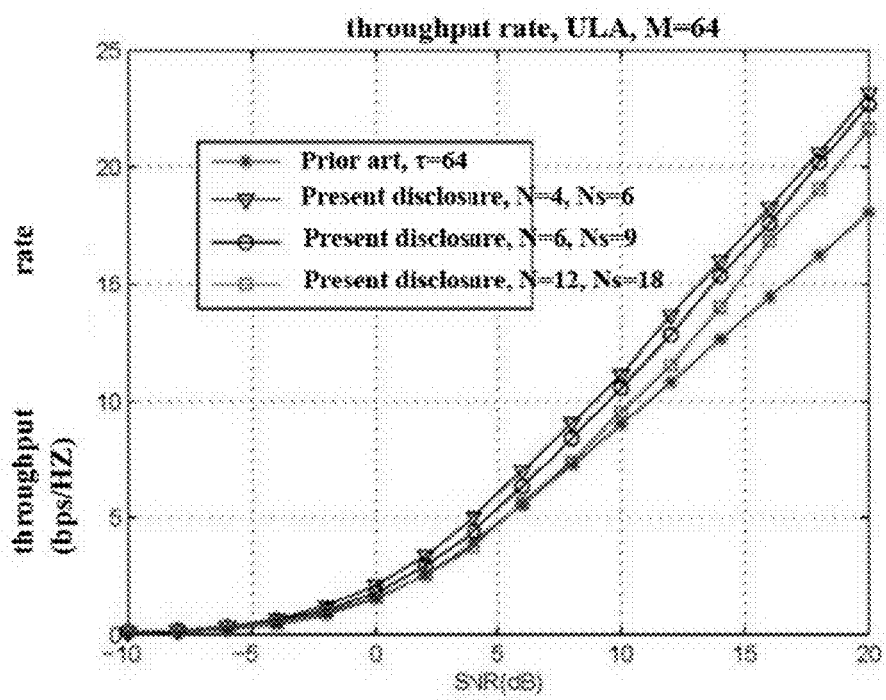
FIG. 24 is a simulation diagram of one example of the throughput rate of a cell in a communication system according to an embodiment of the present disclosure.

FIG. 24 is a simulation diagram of one example of the throughput rate of a cell in the communication system according to an embodiment of the present disclosure. FIG. 25 is a simulation diagram of another example of the throughput rate of a cell in the communication system according to an embodiment of the present disclosure.

Figure 25:
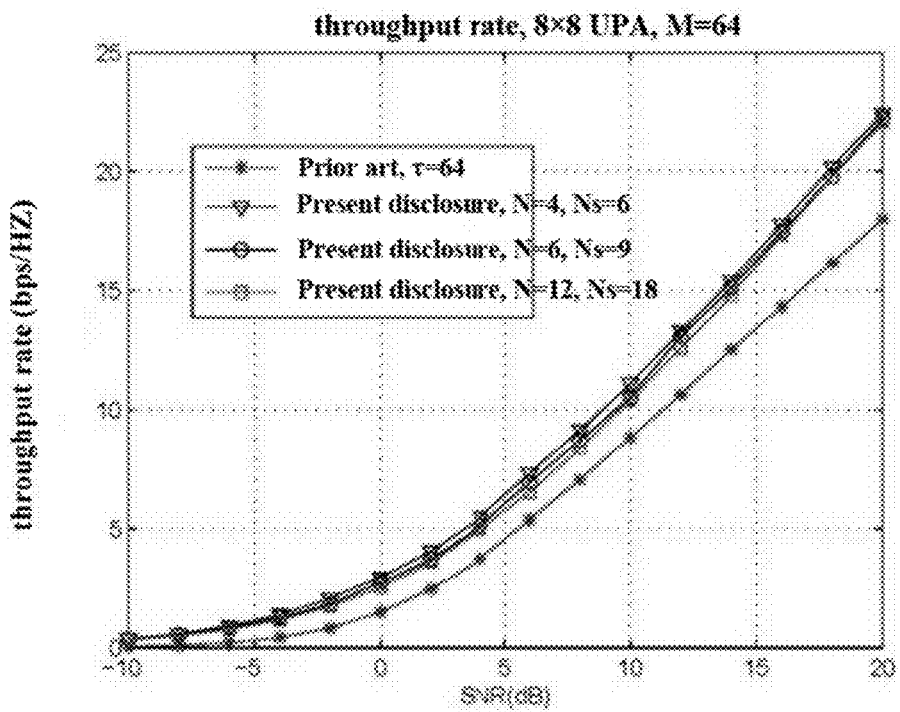
FIG. 25 is a simulation diagram of another example of the throughput rate of a cell in a communication system according to an embodiment of the present disclosure.

Specifically, FIG. 24 and FIG. 25 show comparison of the downlink throughput rate of a cell between the traditional scheme and the scheme of the present disclosure in the case of ULA and UPA antennas, respectively. It can be seen that, compared to the traditional scheme, the angle domain channel estimation method proposed in the present disclosure can improve the downlink throughput rate of the cell. Specifically, in the case of high signal-to-noise ratio, the downlink throughput rate of the cell is increased by about 26% and 23%, respectively.

In addition, it can note that the angle domain channel estimation method has a considerable gain under each SNR condition in the UPA scenario, because the channel sparsity is stronger in the UPA antenna scenario.

8. APPLICATION EXAMPLE

The technique of the present disclosure can be applied to various products.

For example, the UE may be implemented as a mobile terminal such as a smart phone, a tablet personal computer (PC), a notebook PC, a portable game terminal, a portable/dongle type mobile router, and a digital camera, or an on-board terminal such as a car navigation device. The UE may also be implemented as a terminal performing machine-to-machine (M2M) communication, also referred to as a machine type communication (MTC) terminal. In addition, the UE may be a wireless communication module installed on each of the aforementioned terminals, such as an integrated circuit module including a single wafer.

For example, the BS may be implemented as any type of evolved Node B (eNB), such as a macro eNB and a small eNB. A small eNB may be an eNB that covers cells smaller than the macro cells, such as a pico eNB, a micro eNB, or a home (femto) eNB. Alternatively, the BS may be implemented as any other type of BS, such as a NodeB and a Base Transceiver Station (BTS). The BS may comprise: a main unit that is configured to control wireless communication, also referred to as a BS device, and one or more remote wireless headends (RRHs) that are located in different locations from the main unit. In addition, various types of terminals described below may operate as a BS by temporarily or semi-permanently performing the functions of a BS.

8-1. Application Example of User Equipment

First Application Example

Figure 26:
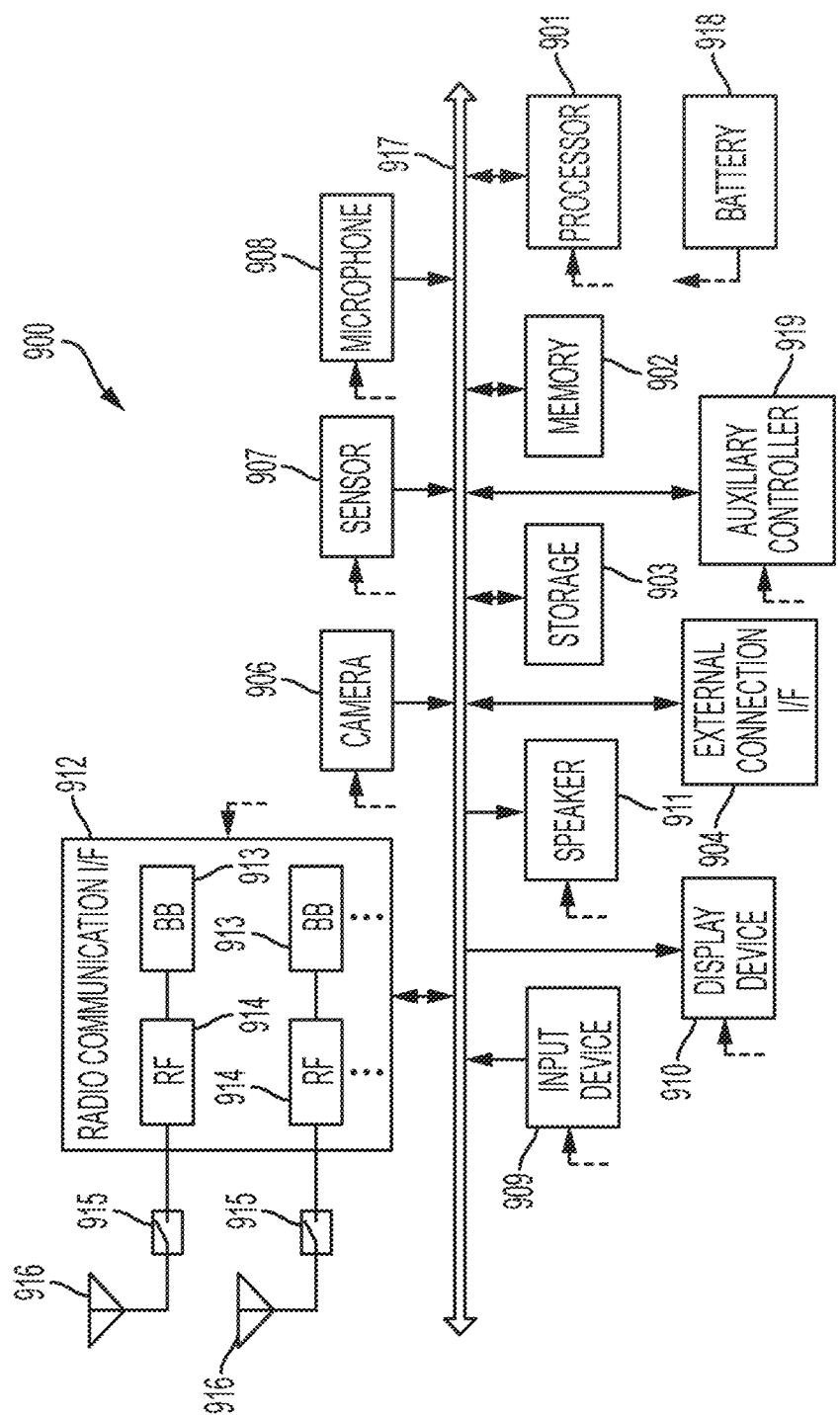
FIG. 26 is a block diagram illustrating an example of the schematic configuration of a smart phone according to an embodiment of the present disclosure.

FIG. 26 is a block diagram illustrating an example of a schematic configuration of a smart phone 900 to which the technique of the present disclosure can be applied. The smart phone 900 includes a processor 901, memory 902, a storage device 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system-on-chip (SoC), and controls functions of an application layer and other layers of the smart phone 900. The memory 902 includes a RAM and a ROM, and stores data and programs executed by the processor 901. The storage device 903 may comprise a storage medium such as a semiconductor memory and a hard disk. The external connection interface 904 is an interface for connecting an external device (such as, a memory card and a Universal Serial Bus (USB) device) to the smart phone 900.

The camera 906 includes an image sensor, such as, a charge coupled device (CCD) and a complementary metal oxide semiconductor (CMOS), and generates captured images. The sensor 907 may include a set of sensors, such as a measurement sensor, a gyro sensor, a geomagnetic sensor, and an acceleration sensor. The microphone 908 converts sounds input to the smart phone 900 into audio signals. The input devices 909 comprise, for example, a touch sensor configured to detect touches on the screen of the display device 910, a keypad, a keyboard, buttons, or switches, and receive operations or information input from a user. The display device 910 includes a screen, such as, a liquid crystal display (LCD) and an organic light emitting diode (OLED) display, and displays output images of the smart phone 900. The speaker 911 converts audio signals output from the smart phone 900 into sounds.

The wireless communication interface 912 supports any cellular communication schemes, such as LTE and LTE-Advanced, and performs wireless communication. The wireless communication interface 912 may generally include, for example, a BB processor 913 and an RF circuit 914. The BB processor 913 can perform, for example, encoding/decoding, modulation/demodulation, and multiplexing/demultiplexing, and performs various types of signal processing for wireless communication. Meanwhile, the RF circuit 914 may include, for example, a mixer, a filter, and an amplifier, and transmit and receive wireless signals via the antenna 916. The wireless communication interface 912 may be a chip module on which the BB processor 913 and the RF circuit 914 are integrated. As shown in FIG. 21, the wireless communication interface 912 may include multiple BB processors 913 and multiple RF circuits 914. Although FIG. 21 shows an example in which the wireless communication interface 912 includes multiple BB processors 913 and multiple RF circuits 914, the wireless communication interface 912 may also include a single BB processor 913 or a single RF circuit 914.

Further, in addition to cellular communication schemes, the wireless communication interface 912 may support other types of wireless communication schemes, such as a short-range wireless communication scheme, a near-field communication scheme, and a wireless local area network (LAN) scheme. In this case, the wireless communication interface 912 may include a BB processor 913 and an RF circuit 914 for each wireless communication scheme.

Each of the antenna switches 915 switches, among a plurality of circuits included in the wireless communication interface 912 (for example, circuits for different wireless communication schemes), the connection destination of the antenna 916.

Each of the antennas 916 includes a single antenna element or multiple antenna elements, such as multiple antenna elements included in a MIMO antenna, and is used by the wireless communication interface 912 to transmit and receive wireless signals. As shown in FIG. 21, the smart phone 900 may include a plurality of antennas 916. Although FIG. 21 shows an example in which the smart phone 900 includes a plurality of antennas 916, the smart phone 900 may also include a single antenna 916.

In addition, the smart phone 900 may include an antenna 916 for each wireless communication scheme. In this case, the antenna switch 915 may be omitted from the configuration of the smart phone 900.

The bus 917 connects the processor 901, the memory 902, the storage device 903, the external connection interface 904, the camera 906, the sensors 907, the microphone 908, the input devices 909, the display device 910, the speaker 911, the wireless communication interface 912, and the auxiliary controller 919 to each other. The battery 918 supplies power to each block of the smart phone 900 shown in FIG. 21 via feed lines, which are partially shown by dotted lines in the figure. The auxiliary controller 919 operates minimum necessary functions of the smart phone 900 in the sleep mode, for example.

In the smart phone 900 shown in FIG. 26, one or more components included in the processing circuit 720 described with reference to FIG. 7 may be implemented in the wireless communication interface 912. Alternatively, at least a part of these components may be implemented in the processor 901 or the auxiliary controller 919. As an example, the smart phone 900 includes a part of the wireless communication interface 912, eg, the BB processor 913, or the entirety of the wireless communication interface 912, and/or a module including the processor 901 and/or the auxiliary controller 919, and one or more components may be implemented in this module. In this case, the module may store a program that allows a processor to function as one or more components, in other words, a program for allowing the processor to perform operations of the one or more components, and may execute the program. As another example, a program for allowing a processor to function as one or more components may be installed in the smart phone 900, and the wireless communication interface 912 (eg, the BB processor 913), the processor 901, and/or the auxiliary controller 919 can execute this program. As described above, as a device including one or more components, a smart phone 900 or a module may be provided, and a program for allowing a processor to function as one or more components may be provided. In addition, a readable medium having the program recorded therein may be provided.

Second Application Example

Figure 27:
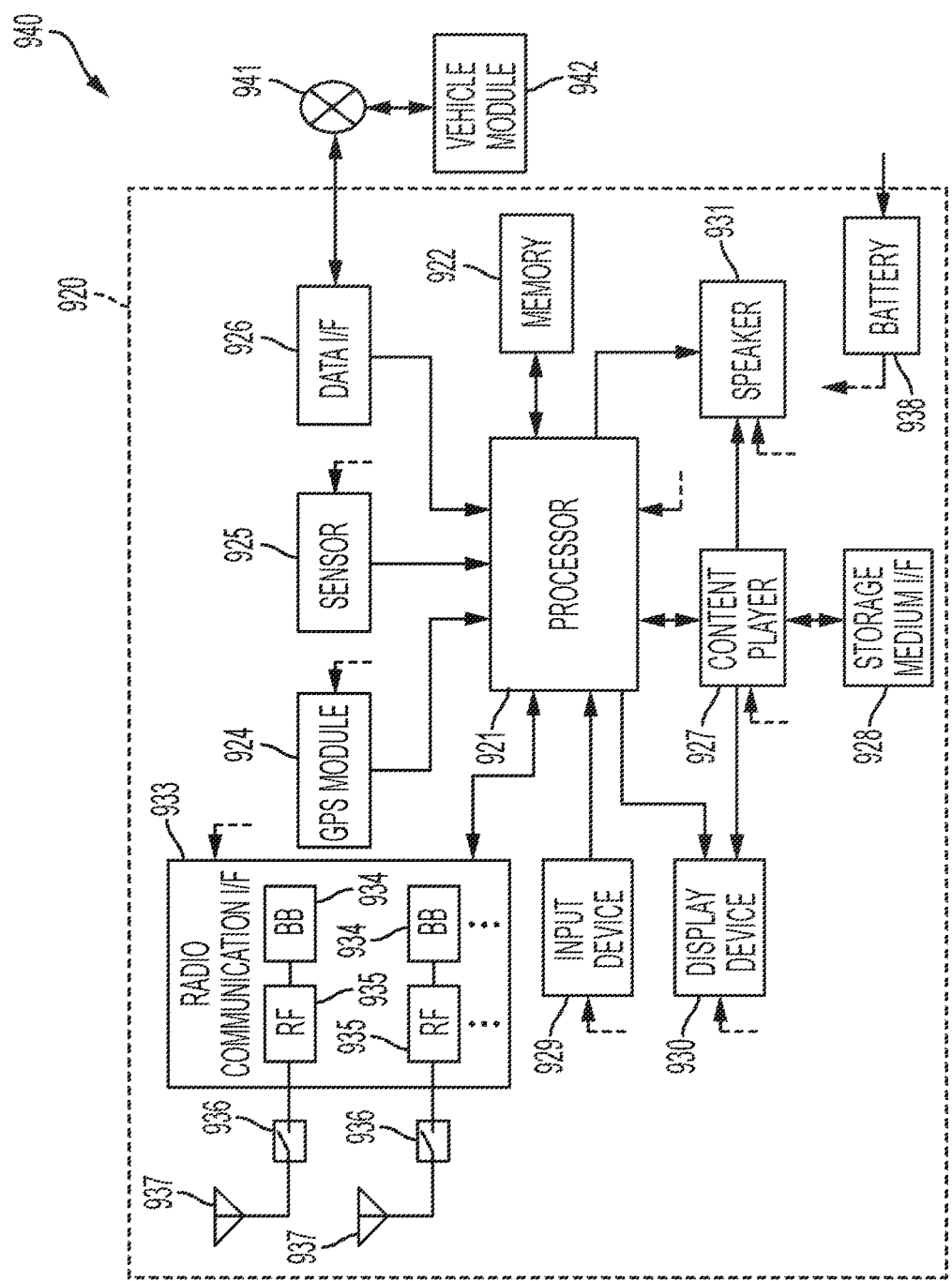
FIG. 27 is a block diagram illustrating an example of the schematic configuration of a car navigation device according to an embodiment of the present disclosure.

FIG. 27 is a block diagram illustrating an example of a schematic configuration of a car navigation device 920 to which the technique of the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, and a wireless communication interface 933, one or more antenna switches 936, one or more antennas 937, and a battery 938.

The processor 921 may be, for example, a CPU or a SoC, and controls the navigation function and other functions of the car navigation device 920. The memory 922 includes a RAM and a ROM, and stores data and programs executed by the processor 921.

The GPS module 924 uses GPS signals received from GPS satellites to measure the position of the car navigation device 920, such as latitude, longitude and altitude thereof. The sensor 925 may include a set of sensors such as a gyro sensor, a geomagnetic sensor, and an air pressure sensor. The data interface 926 is connected to, for example, an on-vehicle network 941 via a terminal (not shown), and acquires data, such as, vehicle speed data, generated by the vehicle.

The content player 927 reproduces contents stored in a storage medium, such as a CD and a DVD, which is inserted into the storage medium interface 928. The input device 929 include, for example, a touch sensor configured to detect touches on the screen of the display device 930, buttons or switches, and receive operations or information input from a user. The display device 930 includes a screen such as an LCD or an OLED display, and displays images of the navigation function or reproduced contents. The speaker 931 outputs sounds of the navigation function or reproduced contents.

The wireless communication interface 933 supports any cellular communication schemes, such as LTE and LTE-Advanced, and performs wireless communication. The wireless communication interface 933 may generally include, for example, a BB processor 934 and a RF circuit 935. The BB processor 934 may perform, for example, encoding/decoding, modulation/demodulation, and multiplexing/demultiplexing, and performs various types of signal processing for wireless communication. Meanwhile, the RF circuit 934 may include, for example, a mixer, a filter, and an amplifier, and transmit and receive wireless signals via the antennas 937. The wireless communication interface 933 may be a chip module on which the BB processor 934 and the RF circuit 935 are integrated. As shown in FIG. 22, the wireless communication interface 933 may include multiple BB processors 934 and multiple RF circuits 935. Although FIG. 22 shows an example in which the wireless communication interface 933 includes multiple of BB processors 934 and multiple RF circuits 935, the wireless communication interface 933 may include a single BB processor 934 or a single RF circuit 935.

Further, in addition to cellular communication schemes, the wireless communication interface 933 may support other types of wireless communication schemes, such as a short-range wireless communication scheme, a near-field communication scheme, and a wireless LAN scheme. In this case, the wireless communication interface 933 may include a BB processor 934 and an RF circuit 935 for each wireless communication scheme.

Each of the antenna switches 936 switches, among a plurality of circuits included in the wireless communication interface 933, for example, circuits for different wireless communication schemes, connection destination of the antennas 937.

Each of the antennas 937 includes a single antenna element or multiple antenna elements, such as multiple antenna elements included in a MIMO antenna, and is used by the wireless communication interface 933 to transmit and receive wireless signals. As shown in FIG. 22, the car navigation device 920 may include a plurality of antennas 937. Although FIG. 22 shows an example in which the car navigation device 920 includes a plurality of antennas 937, the car navigation device 920 may also include a single antenna 937.

In addition, the car navigation device 920 may include an antenna 937 for each wireless communication scheme. In this case, the antenna switches 936 may be omitted from the configuration of the car navigation device 920.

The battery 938 supplies power to each block of the car navigation device 920 shown in FIG. 22 via feeder lines, which are partially shown as dotted lines in the figure. The battery 938 accumulates power provided from the vehicle.

In the car navigation device 920 shown in FIG. 27, one or more components included in the processing circuit 720 described with reference to FIG. 7 may be implemented in the wireless communication interface 933. Alternatively, at least a part of these components may be implemented in the processor 921. As an example, the car navigation device 920 includes a part of the wireless communication interface 933, eg, the BB processor 934, or the entirety of the wireless communication interface 933, and/or a module including the processor 921, and one or more components may be implemented in the module. In this case, the module may store a program that allows a processor to function as one or more components, in other words, a program for allowing the processor to perform operations of one or more components, and may execute the program. As another example, a program for allowing the processor to function as one or more components may be installed in the car navigation device 920, and the wireless communication interface 933, eg, the BB processor 934, and/or the processor 921 may execute the program. As described above, as a device including one or more components, the car navigation device 920 or a module may be provided, and a program for allowing the processor to function as one or more components may be provided. In addition, a readable medium having the program recorded therein may be provided.

The technique of this disclosure may also be implemented as an on-board system (or vehicle) 940 that includes one or more blocks of the car navigation device 920, the on-board network 941, and the vehicle module 942. The vehicle module 942 generates vehicle data, such as vehicle speed, engine speed, and failure information, and outputs the generated data to the on-vehicle network 941.

8-2. Application Example of Base Station

First Application Example

Figure 28:
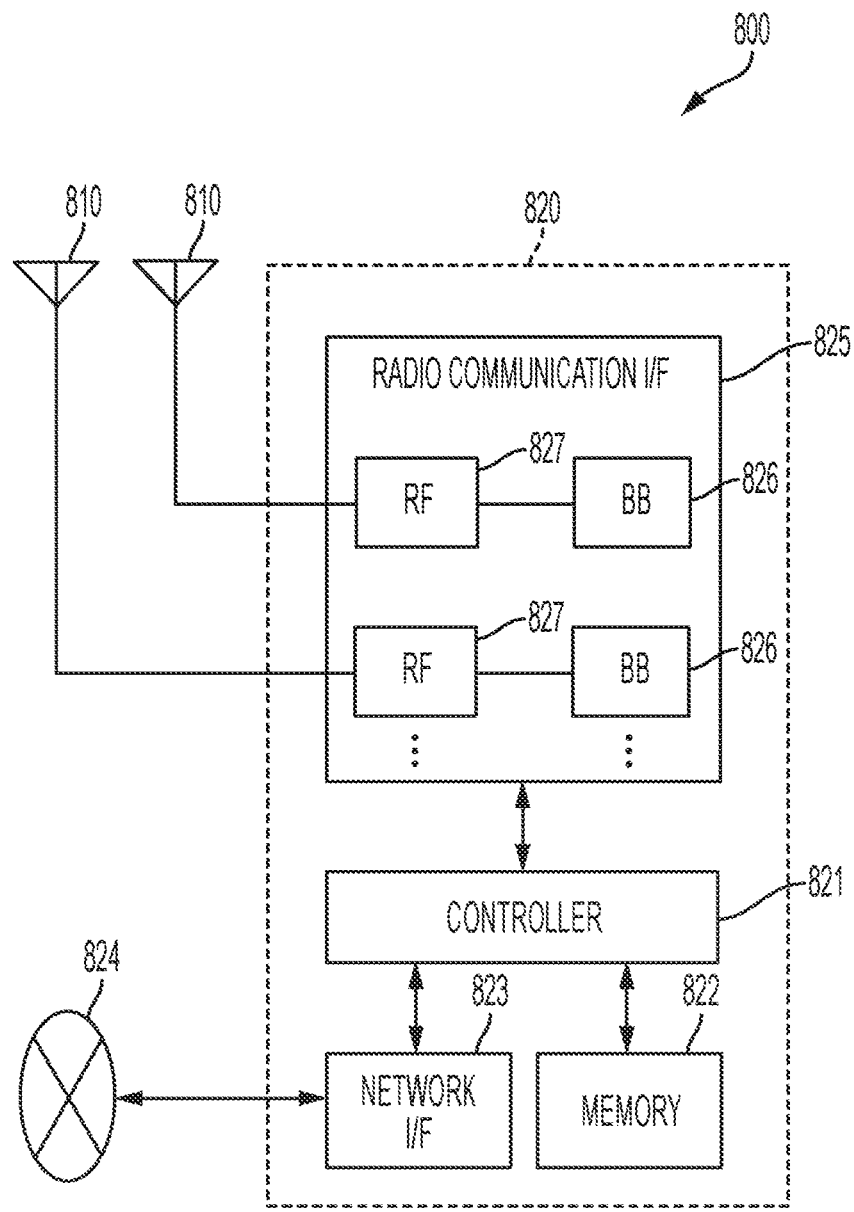
FIG. 28 is a block diagram illustrating a first example of the schematic configuration of an eNB according to an embodiment of the present disclosure.

FIG. 28 is a block diagram illustrating a first example of the schematic configuration of a BS to which the technique of the present disclosure may be applied. Wherein, the base station is shown as eNB 800. Wherein, the eNB 800 includes one or more antennas 810 and a base station (BS) device 820. The BS device 820 is connected to each antenna 810 via RF cables.

Each of the antennas 810 includes a single antenna element or multiple antenna elements, such as a plurality of antenna elements included in a Multiple Input Multiple Output (MIMO) antenna, and is used by the BS device 820 to transmit and receive wireless signals. As shown in FIG. 23, the eNB 800 may include multiple antennas 810. For example, the multiple antennas 810 may be compatible with multiple frequency bands used by the eNB 800. Although FIG. 23 shows an example in which the eNB 800 includes multiple antennas 810, the eNB 800 may also include a single antenna 810.

The BS device 820 includes a controller 821, a memory 822, a network interface 823, and a wireless communication interface 825.

The controller 821 may be, for example, a CPU or a DSP, and operates various functions of the BS device 820 in a higher level. For example, the controller 821 generates data packets based on data in signals processed by the wireless communication interface 825, and delivers the generated packets via the network interface 823. The controller 821 can bundle data from multiple baseband processors to generate bundled packets and deliver the generated bundled packets. The controller 821 may have logic functions that perform controls such as radio resource control, radio bearer control, mobility management, admission control and scheduling. This control can be performed in conjunction with nearby eNBs or core network nodes. The memory 822 includes a RAM and a ROM and stores programs executed by the controller 821 and various types of control data, such as a terminal list, transmission power data, and scheduling data.

The network interface 823 is a communication interface for connecting the BS device 820 to a core network 824. The controller 821 may communicate with the core network node or another eNB via the network interface 823. In this case, eNB 800 and core network nodes or other eNBs may be connected to each other through logical interfaces, such as S1 interfaces and X2 interfaces. The network interface 823 may also be a wired communication interface or a wireless communication interface for a wireless backhaul line. If the network interface 823 is a wireless communication interface, the network interface 823 can use a higher frequency band for wireless communication than the frequency band used by the wireless communication interface 825.

The wireless communication interface 825 supports any cellular communication schemes, such as Long Term Evolution (LTE) and LTE-Advanced, and provides wireless connection to terminals located in a cell of the eNB 800 via the antennas 810. The wireless communication interface 825 may generally include, for example, a baseband (BB) processor 826 and an RF circuit 827. The BB processor 826 may perform, for example, encoding/decoding, modulation/demodulation, and multiplexing/demultiplexing, and performs various types of signal processing in layers such as L1, Medium Access Control (MAC), Radio Link Control (RLC), and Packet Data Convergence Protocol (PDCP). Instead of the controller 821, the BB processor 826 may have some or all of the above-described logic functions. The BB processor 826 may be a memory that stores a communication control program, or a module that includes a processor and related circuits that are configured to execute a program. An update program may change the functions of the BB processor 826. This module may be a card or blade inserted into a slot of the BS device 820. Alternatively, the module may also be a chip mounted on a card or blade. Meanwhile, the RF circuit 827 may include, for example, a mixer, a filter and an amplifier, and transmit and receive wireless signals via the antenna 810.

As shown in FIG. 28, the wireless communication interface 825 may include multiple BB processors 826. For example, the multiple BB processors 826 may be compatible with multiple frequency bands used by eNB 800. As shown in FIG. 28, the wireless communication interface 825 may include multiple RF circuits 827. For example, the multiple RF circuits 827 may be compatible with multiple antenna elements. Although FIG. 23 shows an example in which the wireless communication interface 825 includes multiple BB processors 826 and multiple RF circuits 827, the wireless communication interface 825 may also include a single BB processor 826 or a single RF circuit 827.

In the eNB 800 shown in FIG. 28, one or more components included in the processing circuit 620 described with reference to FIG. 6 may be implemented in the wireless communication interface 825. Alternatively, at least a part of these components may be implemented in the controller 821. For example, the eNB 800 includes a part of the wireless communication interface 825, e.g., the BB processor 826, or the entirety of the wireless communication interface 825, and/or a module including the controller 821, and one or more components may be implemented in the module. In this case, the module may store a program for allowing the processor to function as one or more components, in other words, a program for allowing the processor to perform operations of one or more components, and may execute the program. As another example, a program for allowing the processor to function as one or more components may be installed in the eNB 800, and the wireless communication interface 825, eg, the BB processor 826, and/or the controller 821 may perform the program. As described above, as a device including one or more components, the eNB 800, the BS device 820, or a module may be provided, and a program for allowing the processor to function as one or more components may be provided. In addition, a readable medium having the program recorded therein may be provided.

Second Application Example

Figure 29:
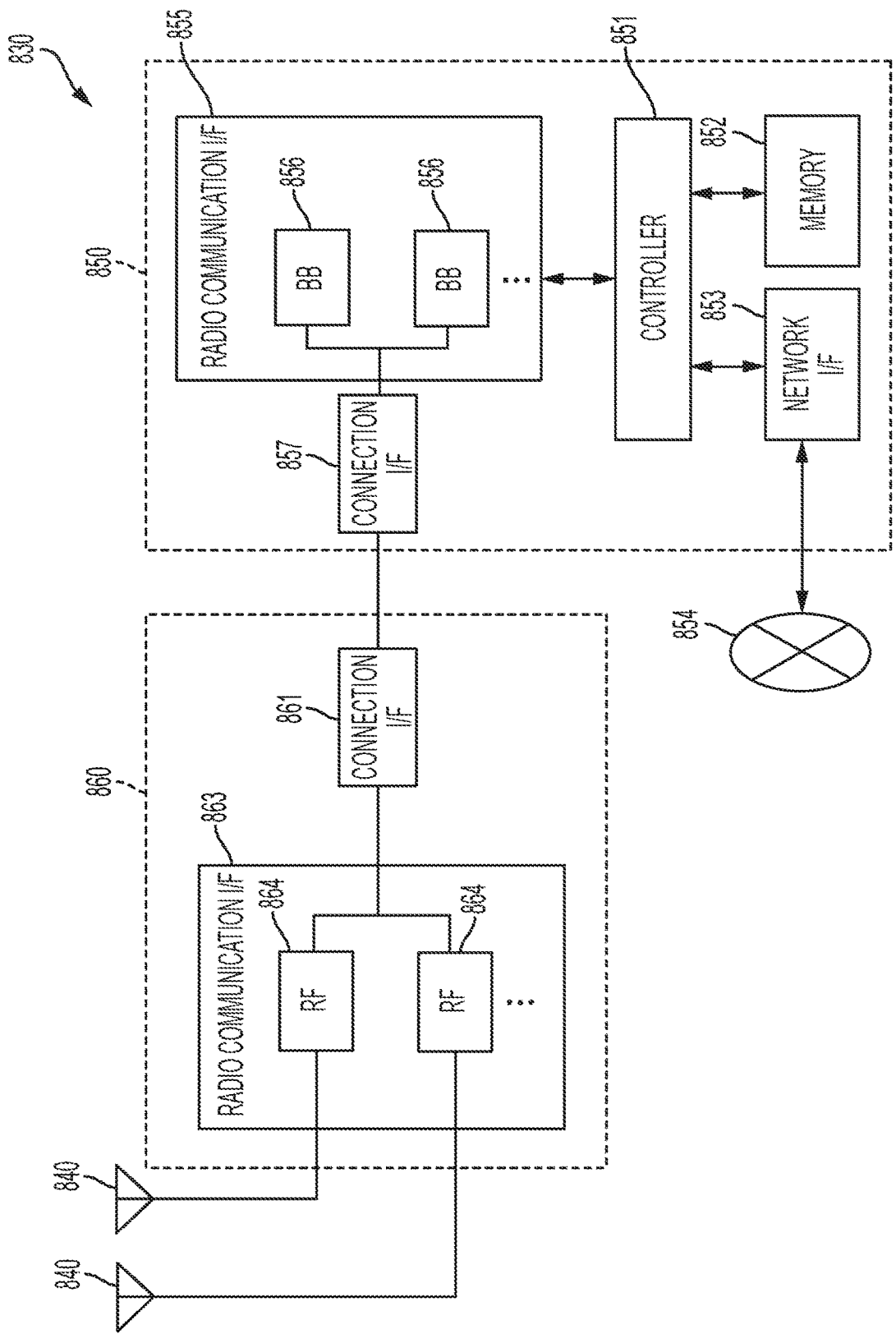
FIG. 29 is a block diagram illustrating a second example of the schematic configuration of an eNB according to an embodiment of the present disclosure.

FIG. 29 is a block diagram illustrating a second example of the schematic configuration of a BS to which the technique of the present disclosure may be applied. Wherein, the base station is shown as eNB 830. The eNB 830 includes one or more antennas 840, a BS device 850 and a RRH 860. The RRH 860 is connected to each antenna 840 via RF cables. The BS device 850 and the RRH 860 may be connected to each other via a high-speed line such as a fiber optic cable.

Each of the antennas 840 includes a single antenna element or multiple antenna elements, such as a plurality of antenna elements included in a Multiple Input Multiple Output (MIMO) antenna, and is used by the RRH 860 to transmit and receive wireless signals. As shown in FIG. 24, the eNB 830 may include multiple antennas 840. For example, the multiple antennas 840 may be compatible with multiple frequency bands used by the eNB 830. Although FIG. 24 shows an example in which the eNB 830 includes multiple antennas 840, the eNB 830 may also include a single antenna 840.

The BS device 850 includes a controller 851, a memory 852, a network interface 853, a wireless communication interface 855 and a connection interface 857. The controller 851, the memory 852, and the network interface 853 are the same as the controller 821, the memory 822, and the network interface 823 described with reference to FIG. 23.

The wireless communication interface 855 supports any cellular communication schemes, such as Long Term Evolution (LTE) and LTE-Advanced, and provides wireless communication to a terminal located in a sector corresponding to the RRH 860 via the RRH 860 and the antenna 840. The wireless communication interface 855 may generally include, for example, a BB processor 856. Except that the BB processor 856 is connected to the RF circuit 864 of the RRH 860 via the connection interface 857, the BB processor 856 is the same as the BB processor 826 described with reference to FIG. 23. As shown in FIG. 24, the wireless communication interface 855 may include multiple BB processors 856. For example, the multiple BB processors 856 may be compatible with multiple frequency bands used by eNB 830. Although FIG. 24 shows an example in which the wireless communication interface 855 includes multiple BB processors 856, the wireless communication interface 825 may also include a single BB processor 856.

The connection interface 857 is an interface for connecting the BS device 850 (the wireless communication interface 855) to the RRH 860. The connection interface 857 may also be a communication module for communicating the BS device 850 (the wireless communication interface 855) to the above described high-speed line of the RRH 860.

The RRH 860 includes a connection interface 861 and a wireless communication interface 863.

The connection interface 861 is an interface for connecting the RRH 860 (the wireless communication interface 863) to the BS device 850. The connection interface 861 may also be a communication module for communication on the above high speed line.

The wireless communication interface 863 transmits and receives wireless signals via the antenna 840. The wireless communication interface 863 may generally include, for example, an RF circuit 864. The RF circuit 864 may include, for example, a mixer, a filter and an amplifier, and transmit and receive wireless signals via the antenna 840. As shown in FIG. 24, the wireless communication interface 863 may include multiple RF circuits 864. For example, the multiple RF circuits 864 may support multiple antenna elements. Although FIG. 24 shows an example in which the wireless communication interface 863 includes multiple RF circuits 864, the wireless communication interface 863 may also include a single RF circuit 864.

In the eNB 800 shown in FIG. 29, one or more components included in the processing circuit 620 described with reference to FIG. 6 may be implemented in the wireless communication interface 825. Alternatively, at least a portion of these components may be implemented in the controller 821. For example, the eNB 800 includes a part of the wireless communication interface 825, e.g., the BB processor 826, or the entirety of the wireless communication interface 825, and/or a module including the controller 821, and one or more components may be implemented in the module. In this case, the module may store a program for allowing the processor to function as one or more components (in other words, a program for allowing the processor to perform operations of one or more components), and may execute the program. As another example, a program for allowing the processor to function as one or more components may be installed in the eNB 800, and the wireless communication interface 825 (eg, the BB processor 826) and/or the controller 821 may perform the program. As described above, as a device including one or more components, the eNB 800, the BS device 820, or a module may be provided, and a program for allowing the processor to function as one or more components may be provided. In addition, a readable medium having the program recorded therein may be provided.

6. CONCLUSION

According to some embodiments of the present disclosure, overhead of channel estimation may be reduced.

According to some embodiments of the present disclosure, it is also possible to further increase the data throughput rate of the communication system while maintaining lower overhead of channel estimation.

An example has been described in which the communication system is a system complying with LTE or LTE-A, but the embodiments of the present disclosure are not limited to the related example. For example, the communication system may be a system that complies with another communication standard. In this case, the UE may be another terminal device and the base station may be another base station.

In the description of this specification, reference throughout this specification to "embodiment" or similar expressions means that a particular feature, structure, or characteristic described in connection with the embodiment is included in at least one embodiment of the present invention. Therefore, the appearances of terms "in the embodiments of the present disclosure" and similar expressions do not necessarily refer to the same embodiments in this specification.

Those skilled in the art will appreciate that the present disclosure is implemented as a system, apparatus, method, or computer readable medium as a computer program product. Accordingly, the present disclosure may be embodied in various forms, such as a complete hardware embodiment, a complete software embodiment (including firmware, resident software, microprogram code, etc.), or may also be implemented as an implementation of software and hardware, which will be referred to as "circuit," "module," or "system" below. In addition, the present disclosure may also be embodied in any form of tangible media such as a computer program product having computer-usable program code stored thereon.

The related description of the present disclosure will be described with reference to flowcharts and/or block diagrams of systems, apparatuses, methods, and computer program products according to specific embodiments of the present disclosure. It will be understood that each block in each flowchart and/or block diagram, and any combination of blocks in the flowcharts and/or block diagrams, can be implemented using computer program instructions. These computer program instructions may be executed by a machine consisting of a general-purpose or special-purpose computer processor or other programmable data processing device, and the instructions are processed by a computer or other programmable data processing device to implement functions or operations described in the flowcharts and/or block diagrams.

Flowcharts and block diagrams of architectures, functions, and operations that may be implemented by systems, apparatuses, methods, and computer program products according to various embodiments of the present disclosure are shown in the drawings. Thus, each block in the flowcharts or block diagrams may represent a module, section, or portion of program code that includes one or more executable instructions to perform a specified logical function. It should also be noted that in some other embodiments, the functionality described in the blocks may not be performed in the order shown in the drawings. For example, the two blocks that are connected in a figure blocks may in fact be executed simultaneously or, in some cases, may be performed in the reverse order depending on the function involved. In addition, it should be noted that blocks in each block diagram and/or flowchart, and combinations of blocks in the block diagram and/or flowchart, may be implemented by a dedicated hardware-based system or by a combination of dedicated hardware and computer instructions, to perform a specific function or operation.

What is claimed is:

1. An electronic device for a base station comprising multiple antennas, comprising:
   a memory for storing computer instructions; and
   a processing circuit configured to execute the stored computer instructions to:
   based on channel states of channels between the multiple antennas of the base station and a user equipment (UE), determine channel characteristics of an uplink channel from the base station to the UE in an angle domain;
   based on the determined channel characteristics of the uplink channel in the angle domain, determine a second set of pilot signals for estimating channel characteristics of a downlink channel from the UE to the base station in the angle domain, wherein the second set of pilot signals is used in the angle domain; and
   control the multiple antennas of the base station to transmit the second set of pilot signals to the UE.

2. The electronic device according to claim 1, wherein the processing circuit is further configured to execute the stored computer instructions to:
   based on the determined channel characteristics of the uplink channel in the angle domain, determine a first set of pilot signals used in the angle domain, the pilot signals in the first set of pilot signals being orthogonal to each other; and
   transform the first set of pilot signals into the second set of pilot signals.

3. The electronic device according to claim 1, wherein the channel states of the channels between the multiple antennas of the base station and the UE correspond to channel states of channels from the UE to the multiple antennas of the base station, and the processing circuit is further configured to execute the stored computer instructions to:

based on the channel states of the channels from the UE to the multiple antennas of the base station, determine the channel characteristics of the downlink channel from the UE to the base station in the angle domain, and determine the channel characteristics of the uplink channel in the angle domain based on the channel characteristics of the downlink channel in the angle domain.

4. The electronic device according to claim 1, wherein the channel states of the channels between the multiple antennas of the base station and the UE correspond to channel states of channels from the multiple antennas of the base station to the UE, and the processing circuit is further configured to execute the stored computer instructions to:

determine the channel characteristics of the uplink channel in the angle domain according to the channel states of the channels from the multiple antennas of the base station to the UE.

5. The electronic device according to claim 1, wherein the processing circuit is further configured to execute the stored computer instructions to:

transform the channel states of the channels between the multiple antennas of the base station and the UE to obtain channel characteristics of a corresponding channel in the angle domain.

6. The electronic device according to claim 5, wherein the processing circuit is further configured to execute the stored computer instructions to:

based on the channel characteristics of the corresponding channel in the angle domain, select N angles from the angle domain at which the channel characteristics are significant, where N is a natural number greater than or equal to 1, the number of pilot signals in a first set of pilot signals is greater than or equal to N, and the first set of pilot signals are used for the N angles, respectively.

7. The electronic device according to claim 1, wherein the base station communicates with a plurality of UEs, and the processing circuit is further configured to execute the stored computer instructions to:

determine a first set of pilot signals used in the angle domain for the plurality of UEs, wherein respective pilot signals in the first set of pilot signals are orthonormal to each other with respect to angles as a union of the N angles having significant channel characteristics of the corresponding uplink channel from the base station to each of the multiple UEs in the angle domain, wherein N is a natural number greater than or equal to 1.

8. The electronic device according to claim 1, wherein the base station communicates with a plurality of UEs, and the processing circuit is further configured to execute the stored computer instructions to:

determine a first set of pilot signals used in the angle domain for the plurality of UEs, wherein in the case where the number of pilot signals in the first set of pilot signals is minimum, respective pilot signals in the first set of pilot signals are orthonormal to each other with respect to angles corresponding to N angles having significant channel characteristics in a corresponding uplink channel from the base station to one of the plurality of UEs in the angle domain, wherein N is a natural number greater than or equal to 1.

9. An electronic device for a user equipment (UE), comprising:

a memory for storing computer instructions; and
a processing circuit configured to execute the stored computer instructions to:
perform channel estimation of a downlink channel from a base station comprising multiple antennas to the UE based on a second set of pilot signals from the base station, wherein the second set of pilot signals is determined by the base station by:
based on channel states of channels between the multiple antennas of the base station and the UE, determining channel characteristics of an uplink channel from the base station to the UE in an angle domain;
based on the determined channel characteristics of the uplink channel in the angle domain, determining the second set of pilot signals for estimating channel characteristics of the downlink channel from the UE to the base station in the angle domain, wherein the second set of pilot signals used in the angle domain.

10. The electronic device according to claim 9, wherein the processing circuit is further configured to execute the stored computer instructions to:

based on a result of the channel estimation, determine channel characteristics of the downlink channel at multiple angles corresponding to the second set of pilot signals, which are fed back to the base station.

11. The electronic device according to claim 9, wherein the processing circuit is further configured to execute the stored computer instructions to:

before performing channel estimation on the downlink channel, send an uplink reference signal used for estimating a channel state of the uplink channel from the UE to the base station.

12. The electronic device according to claim 10, wherein the processing circuit is further configured to execute the stored computer instructions to:

feed back significant channel characteristics among channel characteristics of the downlink channel at multiple angles and indexes of the pilot signals.

* * * * *